United States Patent
Ota et al.

(10) Patent No.: US 12,304,986 B2
(45) Date of Patent: May 20, 2025

(54) STYRENE-BASED THERMOPLASTIC RESIN COMPOSITION, PRODUCTION METHOD OF STYRENE-BASED THERMOPLASTIC RESIN COMPOSITION, MOLDED ARTICLE, AND PRODUCTION METHOD OF MOLDED ARTICLE

(71) Applicant: Toray Industries, Inc., Tokyo (JP)

(72) Inventors: Nobuhiko Ota, Ichihara (JP); Takuya Shibata, Ichihara (JP); Takanori Suga, Ichihara (JP)

(73) Assignee: Toray Industries, Inc., Tokyo (JP)

( * ) Notice: Subject to any disclaimer, the term of this patent is extended or adjusted under 35 U.S.C. 154(b) by 926 days.

(21) Appl. No.: 17/436,841

(22) PCT Filed: Jan. 16, 2020

(86) PCT No.: PCT/JP2020/001196
§ 371 (c)(1),
(2) Date: Sep. 7, 2021

(87) PCT Pub. No.: WO2020/188978
PCT Pub. Date: Sep. 24, 2020

(65) Prior Publication Data
US 2022/0177628 A1 Jun. 9, 2022

(30) Foreign Application Priority Data

Mar. 15, 2019 (JP) .................................. 2019-048264
Nov. 14, 2019 (JP) .................................. 2019-206029

(51) Int. Cl.
*C08F 279/02* (2006.01)
*C08F 2/22* (2006.01)
*C08L 25/12* (2006.01)

(52) U.S. Cl.
CPC .............. *C08F 279/02* (2013.01); *C08F 2/22* (2013.01); *C08L 25/12* (2013.01); *C08L 2203/20* (2013.01); *C08L 2203/30* (2013.01)

(58) Field of Classification Search
None
See application file for complete search history.

(56) References Cited

U.S. PATENT DOCUMENTS

| | | |
|---|---|---|
| 10,730,981 B2 | 8/2020 | Shibata et al. |
| 2002/0042476 A1* | 4/2002 | Kido ................. C08L 51/04 525/240 |
| 2020/0140672 A1* | 5/2020 | Choi ................. C08L 51/04 |

FOREIGN PATENT DOCUMENTS

| | | |
|---|---|---|
| EP | 0 700 967 A1 | 3/1996 |
| JP | H08-073685 A | 3/1996 |

(Continued)

*Primary Examiner* — Eli D. Strah
(74) *Attorney, Agent, or Firm* — DLA Piper LLP (US)

(57) ABSTRACT

A styrene-based thermoplastic resin composition includes: (A) a graft copolymer obtained by graft-polymerizing, in the presence of a conjugated-diene-based rubber, (a) a monomer mixture containing at least an aromatic vinyl-based monomer, a methacrylic acid ester-based monomer, and an acrylic acid ester-based monomer; and (B) a vinyl-based copolymer obtained by copolymerizing (b) a monomer mixture containing an aromatic vinyl-based monomer, a methacrylic acid ester-based monomer, and a vinyl cyanide-based monomer, and containing substantial no acrylic acid ester-based monomer.

17 Claims, 1 Drawing Sheet

(56) References Cited

FOREIGN PATENT DOCUMENTS

| JP | 2006-348173 | A | | 12/2006 | |
|----|----|----|----|----|----|
| JP | 2009-235318 | A | | 10/2009 | |
| JP | 2017193606 | A | * | 10/2017 | |
| WO | 2018/220961 | A1 | | 12/2018 | |
| WO | WO-2019066375 | A2 | * | 4/2019 | ............ C08F 279/02 |

* cited by examiner

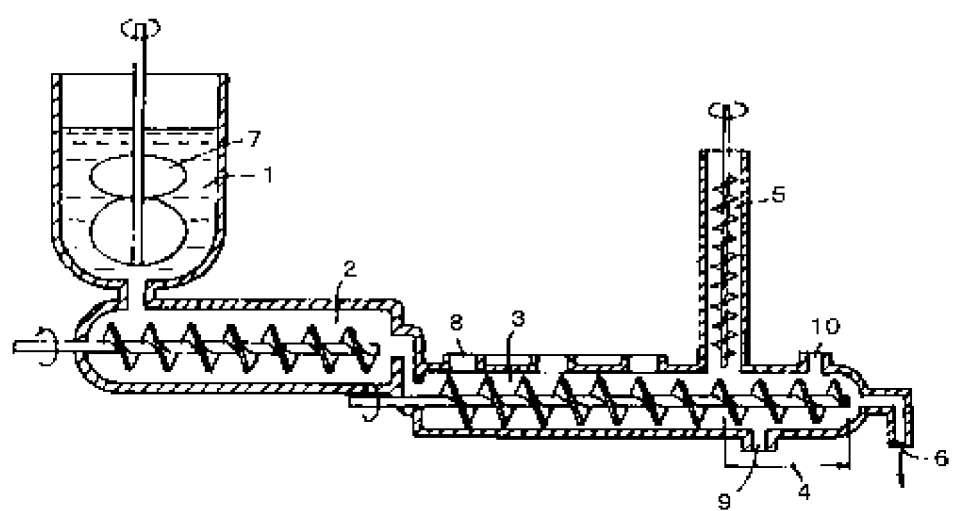

STYRENE-BASED THERMOPLASTIC RESIN COMPOSITION, PRODUCTION METHOD OF STYRENE-BASED THERMOPLASTIC RESIN COMPOSITION, MOLDED ARTICLE, AND PRODUCTION METHOD OF MOLDED ARTICLE

TECHNICAL FIELD

This disclosure relates to a styrene-based thermoplastic resin composition suitably used for home electric appliances, communication devices, general merchandise, medical devices and the like.

BACKGROUND

There is a known ABS resin containing a graft copolymer obtained by copolymerizing (i) an aromatic vinyl compound such as styrene or α-methylstyrene and (ii) a vinyl cyanide compound such as acrylonitrile or methacrylonitrile with a rubbery polymer such as a diene-based rubber. That ABS resin has excellent mechanical strength balance between impact resistance, stiffness and the like, excellent molding-processability, excellent cost-effectiveness and the like and, thus, is widely utilized in applications for home electric appliances, automobile parts and materials, housing equipment and building materials, communication devices, general merchandise and the like.

Furthermore, there is a known transparent ABS resin containing a graft copolymer obtained by copolymerizing (iii) an unsaturated alkyl carboxylate compound such as methyl methacrylate or methyl acrylate. This transparent ABS resin has transparency in addition to a mechanical strength balance between impact resistance, stiffness and the like, molding-processability, cost-effectiveness and the like and, thus, is widely utilized in fields that demand particularly the transparency of products, examples of such fields including home electric appliances, communication devices, general merchandise and the like.

For example, JP 2006-348173 A proposes an approach to enhance the impact resistance, stiffness, and appearance characteristics, that is, discloses an aromatic vinyl-based resin composition obtained by polymerizing (A) 55 to 98 parts by mass of polymerizable monomer containing an aromatic vinyl monomer in the presence of (B) a partially hydrogenated rubber that is a conjugated-diene-based rubber having unsaturated bonds 7 to 70 mol % of which are hydrogenated and (C) 1 to 30 parts by mass of graft copolymer characterized by the volume-average particle system. JP 2017-193606 A proposes an approach to enhance the impact resistance, that is, discloses a core-shell rubber-containing graft copolymer having a core portion containing a rubbery polymer and a graft portion, wherein the graft portion is multilayered, and the outermost layer of the graft portion contains a (meth)acrylate unit and an aromatic monomer unit.

JP 2009-235318 A proposes an approach to enhance the molding-processability and transparency, that is, discloses a styrene-based resin composition including: (I) a rubber-modified styrene-based copolymer composed of (a) a rubbery polymer, (b1) a styrene-based monomer, and (c1) an alkyl (meth)acrylate monomer, wherein the use ratio (by mass) among (a) the rubbery polymer, (b1) the styrene-based monomer, and (c1) the alkyl (meth)acrylate monomer is 8-20:20-60:40-80 as (a):(b1):(c1); (II) a styrene-based copolymer composed of (b2) a styrene-based monomer and (c2) an alkyl (meth)acrylate monomer, wherein the use ratio (by mass) between (b2) the styrene-based monomer and (c2) the alkyl (meth)acrylate monomer is 20-60:40-80 as (b2):(c2); (III-1) an acryl-based polymer that is a polymer of (c3) an alkyl (meth)acrylate monomer, or (III-2) an acryl-based copolymer obtained by polymerizing a monomer containing 20 parts by mass or less of (d1) a vinyl-based monomer in 100 parts by mass of the total of (c3) an alkyl (meth)acrylate monomer and (d1) the vinyl-based monomer copolymerizable with (c3) the alkyl (meth)acrylate monomer; (IV) an acid-modified styrene-based copolymer composed of (b3) a styrene-based monomer and (e) a (meth)acrylic-acid-based monomer, wherein the use ratio (by mass) between (b3) the styrene-based monomer and (e) the (meth)acrylic-acid-based monomer is 80-95:5-20 as (b3):(e); and (V) an organic polysiloxane.

JP 08-073685 A proposes an approach to enhance the flowability, that is, discloses a thermoplastic molding material including a mixture composed of: (A) 15 to 70 mass % of methyl methacrylate-polymer obtained by polymerizing a mixture essentially composed of (A1) 80 to 93 mass % of methyl methacrylate (with respect to A) and (A2) 7 to 20 mass % of $C_{1-8}$-alkyl ester of an acrylic acid (with respect to A), under conditions where the viscosity number is selected in the range of from 55 to 60 ml/g (in a 0.5 mass % solution of dimethylformamide, measured at 23° C.); (B) 10 to 50 mass % of copolymer obtained by polymerizing a mixture essentially composed of (B1) 78 to 88 mass % of vinyl aromatic monomer (with respect to B) and (B2) 12 to 22 mass % of vinyl cyanide (with respect to B), under conditions where the viscosity is selected in the range of from 60 to 80 ml/g (in a 0.5% solution of dimethylformamide, measured at 23° C.); (C) 20 to 50 mass % of graft copolymer obtained by polymerizing, under conditions where an average particle size (d50) of 40 to 500 nm is selected for the graft copolymer, a mixture essentially composed of (C1) 50 to 80 mass % of nucleus obtained by polymerizing a monomer mixture composed of (C11) 50 to 100 mass % of 1,3-diene and (C12) up to 50 mass % of vinyl aromatic monomer, and (C2) 20 to 50 mass % of graft shell obtained by polymerizing, in the presence of (C1) the nucleus, a monomer mixture composed of (C21) 40 to 100 mass % of $C_{1-8}$-alkyl ester of a methacrylic acid or an acrylic acid and (C22) 0 to 60 mass % of vinyl aromatic monomer; and (D) up to 20 mass % of common additive.

However, the above-mentioned approaches have resulted in an insufficient balance between flowability and impact resistance.

It could therefore be helpful to provide a styrene-based thermoplastic resin composition having both excellent impact resistance and good flowability.

SUMMARY

We discovered that a styrene-based thermoplastic resin composition having both excellent impact resistance and good flowability can be obtained through satisfying a specific condition in the preparation of a styrene-based thermoplastic resin composition in which a rubbery-polymer-containing graft copolymer is dispersed in a vinyl-based copolymer obtained by copolymerizing a vinyl-based monomer mixture.

We thus provide:

(1) A styrene-based thermoplastic resin composition including:

(A) a graft copolymer obtained by graft-polymerizing, in the presence of a conjugated-diene-based rubber, (a) a monomer mixture containing at least an aromatic vinyl-based monomer and an acrylic acid ester-based monomer; and (B) a vinyl-based copolymer obtained by polymerizing (b) a monomer mixture containing at least an aromatic vinyl-based monomer and a vinyl cyanide-based monomer and containing substantially no acrylic acid ester-based monomer.

(2) The styrene-based thermoplastic resin composition according to (1), wherein the monomer mixture (a) contains a methacrylic acid ester-based monomer.

(3) The styrene-based thermoplastic resin composition according to (1) or (2), wherein the monomer mixture (b) contains a methacrylic acid ester-based monomer.

(4) The styrene-based thermoplastic resin composition according to any one of (1) to (3),
  wherein the styrene-based thermoplastic resin composition contains a component insoluble in acetone,
  wherein the acetone-insoluble component contains a structural unit derived from the acrylic acid ester-based monomer,
  wherein the content ratio (d1) of the structural unit is 1 to 7 mass % with respect to 100 mass % of the acetone-insoluble component; and
  wherein the ratio (d2/d3) is 4 to 75 between the following:
    the content ratio (d2, mass %) of the structural unit derived from the acrylic acid ester-based monomer in the acetone-insoluble component, with respect to 100 mass % of the mass obtained by subtracting the mass corresponding to the conjugated-diene-based rubber contained in the insoluble component from the mass of the insoluble component; and
    the content ratio (d3, mass %) of a structural unit derived from the acrylic acid ester-based monomer unit in the acetone-soluble component, with respect to 100 mass % of the soluble component in the styrene-based thermoplastic resin composition.

(5) The styrene-based thermoplastic resin composition according to any one of (1) to (4),
  wherein the graft copolymer (A) contains a component insoluble in acetone, and
  wherein the ratio (d4/d5) is 2.0 or less between the following:
    the content ratio (d4, mass %) of a structural unit derived from the acrylic acid ester-based monomer in the acetone-insoluble component, with respect to 100 mass % of the mass obtained by subtracting the mass corresponding to the conjugated-diene-based rubber contained in the insoluble component from the mass of the insoluble component; and
    the content ratio (d5, mass %) of a structural unit derived from the acrylic acid ester-based monomer in the acetone-soluble component, with respect to 100 mass % of the mass of the soluble component contained in the graft copolymer (A).

(6) The styrene-based thermoplastic resin composition according to any one of (1) to (5), wherein the acrylic acid ester-based monomer used for the graft copolymer (A) is n-butyl acrylate or methyl acrylate.

(7) The styrene-based thermoplastic resin composition according to any one of (1) to (6), wherein the content ratio of an acrylic acid ester-based homopolymer is 0.0 mass % to 0.5 mass % with respect to 100 mass % of the mass of the styrene-based thermoplastic resin composition.

(8) A molding obtained by molding the styrene-based thermoplastic resin composition according to any one of (1) to (7).

(9) A method of producing the styrene-based thermoplastic resin composition according to any one of (1) to (7), wherein the graft copolymer (A) is produced by emulsion polymerization.

(10) A method of producing a molding, wherein the molding is obtained by molding a styrene-based thermoplastic resin composition obtained by the production method according to (9).

We make it possible to obtain a styrene-based thermoplastic resin composition having both excellent impact resistance and good flowability. In addition, we make it possible to obtain a styrene-based thermoplastic resin composition having good transparency together.

BRIEF DESCRIPTION OF THE DRAWING

The Drawing is a schematic sectional view of one example of a production apparatus for a styrene-based thermoplastic resin composition.

REFERENCE SIGNS LIST

1 . . . Reactor
2 . . . Preheater
3 . . . Twin Screw Extruder Type Devolatilizer
4 . . . Melt Kneading Zone
5 . . . Twin Screw Extruder Type Feeder
6 . . . Discharge Hole
7 . . . Agitator (Helical Ribbon Impeller)
8 . . . Vent Port
9 . . . Water Inlet
10 . . . Final Vent Port

DETAILED DESCRIPTION

To assist in understanding our compositions, methods and molded articles, hereinafter, (a) a monomer mixture containing no methacrylic acid ester-based monomer is referred to as a monomer mixture (a'); (A) a graft copolymer obtained using the monomer mixture (a') is referred to as a graft copolymer (A'); (a) a monomer mixture containing a methacrylic acid ester-based monomer is referred to as a monomer mixture (a"); (A) a graft copolymer obtained using the monomer mixture (a") is referred to as a graft copolymer (A"); (b) a monomer mixture containing no methacrylic acid ester-based monomer is referred to as a monomer mixture (b'); (B) a vinyl-based polymer obtained using the monomer mixture (b') is referred to as a vinyl-based copolymer (B'); (b) a monomer mixture containing a methacrylic acid ester-based monomer is referred to as a monomer mixture (b"); (B) a vinyl-based polymer obtained using the monomer mixture (b") is referred to as a vinyl-based copolymer (B"). A detailed description is thus provided below.

The phrases "obtained by graft-polymerizing" and "obtained by polymerizing" refer to the state of a graft copolymer (A) and that of a vinyl-based copolymer (B) respectively, for example, a graft copolymer (A) that has resulted from graft-polymerizing a monomer mixture (a) with a conjugated-diene-based rubber, and a vinyl-based copolymer (B) that has resulted from polymerizing a monomer mixture (b).

First, use of a graft copolymer (A') and a vinyl-based copolymer (B') will be described.

A styrene-based thermoplastic resin composition is a resin composition containing the below-mentioned graft copolymer (A') and the below-mentioned vinyl-based copolymer (B'). Containing the graft copolymer (A') makes it possible to enhance the flowability of the styrene-based thermoplastic resin composition and enhance the impact resistance. Containing the vinyl-based copolymer (B') makes it possible to enhance the flowability of the styrene-based thermoplastic resin composition.

The graft copolymer (A') is obtained by graft-polymerizing a monomer mixture (a'), which contains at least an aromatic vinyl-based monomer and an acrylic acid ester-based monomer, in the presence of a conjugated-diene-based rubber. The graft copolymer (A') refers collectively to a polymer produced in a step of obtaining the graft copolymer (A'), and encompasses not only a polymer produced through graft-polymerization with a conjugated-diene-based rubber but also a polymer component produced through no graft-polymerization with a conjugated-diene-based rubber. The monomer mixture (a') may further contain another copolymerizable monomer as below-mentioned (however, excluding a methacrylic acid ester-based monomer).

Examples of conjugated-diene-based rubbers include polybutadiene, poly(butadiene-styrene) (SBR), poly(butadiene-butyl acrylate), poly(butadiene-methyl methacrylate), poly(butadiene-ethyl acrylate), natural rubber and the like. The rubbery polymers may be used in combination of two or more kinds thereof. Among the rubbery polymers, polybutadiene, SBR, and natural rubber are preferably used from the viewpoint of further enhancing the impact resistance and color tone, and polybutadiene is most preferably used.

The amount of the conjugated-diene-based rubber used for the graft copolymer (A') is preferably 20 mass % or more and 80 mass % or less with respect to the total amount of the conjugated-diene-based rubber and the monomer mixture (a'). Using the conjugated-diene-based rubber in an amount of 20 mass % or more makes it possible to further enhance the impact resistance. The amount of the rubbery polymer is more preferably 35 mass % or more. On the other hand, using the conjugated-diene-based rubber in an amount of 80 mass % or less makes it possible to further enhance the impact resistance and flowability of the styrene-based thermoplastic resin composition, and the amount is more preferably 60 mass % or less.

The conjugated-diene-based rubber preferably has a mass-average particle diameter of 0.15 μm or more, more preferably 0.25 μm or more, and preferably 0.4 μm or less, more preferably 0.35 μm or less. Allowing the conjugated-diene-based rubber to have a mass-average particle diameter of 0.15 μm or more makes it possible to inhibit the impact resistance from decreasing. In addition, allowing the conjugated-diene-based rubber to have a mass-average particle diameter of 0.4 μm or less makes it possible to inhibit the flowability from decreasing.

Examples of the aromatic vinyl-based monomer contained in the monomer mixture (a') include styrene, α-methylstyrene, p-methylstyrene, m-methylstyrene, o-methylstyrene, vinyltoluene, t-butyl styrene and the like. The monomer mixture (a') may contain two or more kinds of aromatic vinyl-based monomers. Among these, styrene is preferably used from the viewpoint of further enhancing the flowability and stiffness of the styrene-based thermoplastic resin composition.

The amount of the aromatic vinyl-based monomer contained in the monomer mixture (a') is preferably 45 mass % or more, more preferably 50 mass % or more, still more preferably 60 mass % or more, with respect to 100 mass % of the total of the monomer mixture (a') from the viewpoint of further enhancing the flowability and stiffness of the styrene-based thermoplastic resin composition. On the other hand, the amount of the aromatic vinyl-based monomer contained in the monomer mixture (a') is preferably 90 mass % or less, more preferably 85 mass % or less, still more preferably 80 mass % or less, from the viewpoint of enhancing the impact resistance.

Examples of the acrylic acid ester-based monomer contained in the monomer mixture (a') include esters composed of a $C_{1-6}$ alcohol and an acrylic acid. Such an ester of a $C_{1-6}$ alcohol and an acrylic acid may further have a substituent such as a hydroxyl group or a halogen group. Examples of esters of a $C_{1-6}$ alcohol and an acrylic acid include methyl acrylate, ethyl acrylate, n-propyl acrylate, n-butyl acrylate, t-butyl acrylate, n-hexyl acrylate, cyclohexyl acrylate, chloromethyl acrylate, 3-hydroxypropyl acrylate, 2,3,4,5,6-pentahydroxyhexyl acrylate, 2,3,4,5-tetrahydroxypentyl acrylate and the like. The monomer mixture (a') may contain two or more kinds of acrylic acid ester-based monomers. Among these, methyl acrylate or n-butyl acrylate is preferably used from the viewpoint of enhancing the flowability, and n-butyl acrylate is most preferable.

The amount of the acrylic acid ester-based monomer contained in the monomer mixture (a') is preferably 3 mass % or more, more preferably 5 mass % or more, with respect to 100 mass % of the total of the monomer mixture (a'), from the viewpoint of enhancing the flowability. On the other hand, the amount of the acrylic acid ester-based monomer contained in the monomer mixture (a') is preferably 30 mass % or less, more preferably 25 mass % or less, still more preferably 20 mass % or less, from the viewpoint of further enhancing the flowability.

In addition, the monomer mixture (a') can contain another monomer that can be graft-polymerized with the conjugated-diene-based rubber, for various purposes, provided that such graft-polymerization does not impair the desired effect. Examples of such another monomer include vinyl cyanide-based monomers, unsaturated aliphatic acids, acrylamide-based monomers, maleimide-based monomers and the like. The monomer mixture (a') may contain two or more kinds of such other monomers.

Examples of vinyl cyanide-based monomers include acrylonitrile, methacrylonitrile, ethacrylonitrile and the like. Examples of unsaturated aliphatic acids include itaconic acid, maleic acid, fumaric acid, butenoic acid, acrylic acids, methacrylic acids and the like. Examples of acrylamide-based monomers include acrylamides, methacrylamides, N-methyl acrylamide and the like. Examples of maleimide-based monomers include N-methylmaleimide, N-ethylmaleimide, N-isopropylmaleimide, N-butylmaleimide, N-hexylmaleimide, N-octylmaleimide, N-dodecylmaleimide, N-cyclohexylmaleimide, N-phenylmaleimide and the like.

The vinyl-based copolymer (B') contains at least an aromatic vinyl-based monomer and a vinyl cyanide-based monomer, and is obtained by polymerizing the monomer mixture (b') containing substantially no acrylic acid ester-based monomer. The monomer mixture (b') may further contain another monomer that can be copolymerized.

For examples of the aromatic vinyl-based monomer contained in the monomer mixture (b'), refer to the above description of the monomer mixture (a'). Among others, styrene is preferable.

The amount of the aromatic vinyl-based monomer contained in the monomer mixture (b') is preferably 45 mass % or more, more preferably 50 mass % or more, still more preferably 60 mass % or more, with respect to 100 mass % of the total of the monomer mixture (b') from the viewpoint of further enhancing the flowability and stiffness of the styrene-based thermoplastic resin composition. On the other hand, the amount of the aromatic vinyl-based monomer contained in the monomer mixture (b') is preferably 90 mass % or less, more preferably 85 mass % or less, still more preferably 80 mass % or less, from the viewpoint of enhancing the impact resistance.

The monomer mixture (b') contains substantially no acrylic acid ester-based monomer. The monomer mixture (b') preferably contains completely no acrylic acid ester-based monomer. Containing substantially no such monomer refers to exhibiting no carbon signal attributed to a structural unit derived from an acrylic acid ester-based monomer, as observed according to the below-mentioned analysis method.

Examples of the vinyl cyanide-based monomer contained in the monomer mixture (b') include acrylonitrile, methacrylonitrile, ethacrylonitrile and the like, and the monomer mixture may contain two or more kinds of these. Among these, acrylonitrile is preferably used from the viewpoint of further enhancing the impact resistance.

The amount of the vinyl cyanide-based monomer contained in the monomer mixture (b') is preferably 10 mass % or more, more preferably 15 mass % or more, with respect to 100 mass % of the total of the monomer mixture (b'), from the viewpoint of further enhancing the impact resistance. On the other hand, the amount of the vinyl cyanide-based monomer contained in the monomer mixture (b') is preferably 50 mass % or less, more preferably 40 mass % or less, still more preferably 30 mass % or less, with respect to 100 mass % of the total of the monomer mixture (b'), from the viewpoint of enhancing the color tone of the molding.

In addition, another copolymerizable monomer that can be contained in the monomer mixture (b') is not limited to any particular such monomer provided that such a monomer does not impair the desired effects. Examples of such another monomer include unsaturated aliphatic acids, acrylamide-based monomers, maleimide-based monomers and the like, and the monomer mixture may contain two or more kinds of these. Examples of unsaturated aliphatic acids include itaconic acid, maleic acid, fumaric acid, butenoic acid, acrylic acids, methacrylic acids and the like. Examples of acrylamide-based monomers include acrylamides, methacrylamides, N-methyl acrylamide and the like. Examples of maleimide-based monomers include N-methylmaleimide, N-ethylmaleimide, N-isopropylmaleimide, N-butylmaleimide, N-hexylmaleimide, N-octylmaleimide, N-dodecylmaleimide, N-cyclohexylmaleimide, N-phenylmaleimide and the like.

Next, the graft copolymer (A") obtained from the monomer mixture (a") that is a monomer mixture (a) as used herein as a monomer mixture containing a methacrylic acid ester-based monomer will be described.

The graft copolymer (A") is obtained by graft-polymerizing (a) a monomer mixture containing at least an aromatic vinyl-based monomer, a methacrylic acid ester-based monomer, and an acrylic acid ester-based monomer, in the presence of a conjugated-diene-based rubber. The graft copolymer (A") refers collectively to a polymer produced in a step of obtaining the graft copolymer (A"), and contains not only a polymer produced through graft-polymerization with a conjugated-diene-based rubber but also a polymer component produced through no graft-polymerization with a conjugated-diene-based rubber. As below-mentioned, the monomer mixture (a") may further contain another monomer that can be copolymerized.

Examples of conjugated-diene-based rubbers include polybutadiene, poly(butadiene-styrene) (SBR), poly(butadiene-butyl acrylate), poly(butadiene-methyl methacrylate), poly(butadiene-ethyl acrylate), natural rubber and the like.

The rubbery polymer may be used in combination of two or more kinds thereof. Among the rubbery polymers, polybutadiene, SBR, and natural rubber are preferably used from the viewpoint of further enhancing the impact resistance, transparency, and color tone, and polybutadiene is most preferably used.

The amount of the conjugated-diene-based rubber used for the graft copolymer (A") is preferably 20 mass % or more and 80 mass % or less with respect to the total amount of the conjugated-diene-based rubber and the monomer mixture (a"). Using the conjugated-diene-based rubber in an amount of 20 mass % or more makes it possible to further enhance the impact resistance. The amount of the rubbery polymer is more preferably 35 mass % or more. On the other hand, using the conjugated-diene-based rubber in an amount of 80 mass % or less makes it possible to further enhance the impact resistance, transparency, and flowability of the styrene-based thermoplastic resin composition, and the amount is more preferably 60 mass % or less is.

The conjugated-diene-based rubber preferably has a mass-average particle diameter of 0.15 μm or more, more preferably 0.25 μm or more, and preferably 0.4 μm or less, more preferably 0.35 μm or less. Allowing the conjugated-diene-based rubber to have a mass-average particle diameter of 0.15 μm or more makes it possible to inhibit the impact resistance from decreasing. In addition, allowing the conjugated-diene-based rubber to have a mass-average particle diameter of 0.4 μm or less makes it possible to inhibit the transparency and flowability from decreasing.

Examples of the aromatic vinyl-based monomer contained in the monomer mixture (a") include styrene, α-methylstyrene, p-methylstyrene, m-methylstyrene, o-methylstyrene, vinyltoluene, t-butyl styrene and the like. The monomer mixture (a) may contain two or more kinds of aromatic vinyl-based monomers. Among these, styrene is preferably used from the viewpoint of further enhancing the flowability, transparency, and stiffness of the styrene-based thermoplastic resin composition.

The amount of the aromatic vinyl-based monomer contained in the monomer mixture (a") is preferably 5 mass % or more, more preferably 10 mass % or more, still more preferably 20 mass % or more, with respect to 100 mass % of the total of the monomer mixture (a") from the viewpoint of further enhancing the flowability, stiffness, and transparency of the styrene-based thermoplastic resin composition. On the other hand, the amount of the aromatic vinyl-based monomer contained in the monomer mixture (a") is preferably 40 mass % or less, more preferably 35 mass % or less, still more preferably 30 mass % or less, from the viewpoint of enhancing the impact resistance and transparency.

Examples of the methacrylic acid ester-based monomer contained in the monomer mixture (a") include esters composed of a $C_{1-6}$ alcohol and a methacrylic acid. Such an ester of a $C_{1-6}$ alcohol and a methacrylic acid may further have a substituent such as a hydroxyl group or a halogen group. Examples of esters of a $C_{1-6}$ alcohol and a methacrylic acid include methyl methacrylate, ethyl methacrylate, n-propyl methacrylate, n-butyl methacrylate, t-butyl methacrylate, n-hexyl methacrylate, cyclohexyl methacrylate, chloromethyl methacrylate, 3-hydroxypropyl methacrylate, 2,3,4,5,6-pentahydroxyhexyl methacrylate, 2,3,4,5-tetrahydroxypentyl methacrylate and the like. The monomer mixture (a") may contain two or more kinds of methacrylic acid ester-based monomers. Among these, methyl methacrylate is preferably used from the viewpoint of enhancing the transparency.

The amount of the methacrylic acid ester-based monomer contained in the monomer mixture (a") is preferably 30 mass % or more, more preferably 50 mass % or more, still more preferably 60 mass % or more, with respect to 100 mass % of the total of the monomer mixture (a"), from the viewpoint of enhancing the transparency. On the other hand, the amount of the methacrylic acid ester-based monomer contained in the monomer mixture (a") is preferably 90 mass % or less, more preferably 80 mass % or less, still more preferably 75 mass % or less, from the viewpoint of further enhancing the transparency.

Examples of the acrylic acid ester-based monomer contained in the monomer mixture (a") include esters composed of a $C_{1-6}$ alcohol and an acrylic acid. Such an ester of a $C_{1-6}$ alcohol and an acrylic acid may further have a substituent such as a hydroxyl group or a halogen group. Examples of esters of a $C_{1-6}$ alcohol and an acrylic acid include methyl acrylate, ethyl acrylate, n-propyl acrylate, n-butyl acrylate, t-butyl acrylate, n-hexyl acrylate, cyclohexyl acrylate, chloromethyl acrylate, 3-hydroxypropyl acrylate, 2,3,4,5,6-pentahydroxyhexyl acrylate, 2,3,4,5-tetrahydroxypentyl acrylate and the like. The monomer mixture (a") may contain two or more kinds of acrylic acid ester-based monomers. Among these, methyl acrylate or n-butyl acrylate is preferably used from the viewpoint of enhancing the flowability and transparency, and n-butyl acrylate is most preferable.

The amount of the acrylic acid ester-based monomer contained in the monomer mixture (a") is preferably 3 mass % or more, more preferably 5 mass % or more, with respect to 100 mass % of the total of the monomer mixture (a"), from the viewpoint of enhancing the flowability and transparency. On the other hand, the amount of the acrylic acid ester-based monomer contained in the monomer mixture (a") is preferably 30 mass % or less, more preferably 25 mass % or less, still more preferably 20 mass % or less, from the viewpoint of further enhancing the flowability and transparency.

In addition, the monomer mixture (a") can contain another monomer that can be graft-polymerized with the conjugated-diene-based rubber, for various purposes, provided that such graft-polymerization does not impair the desired effect. Examples of such another monomer include vinyl cyanide-based monomers, unsaturated aliphatic acids, acrylamide-based monomers, maleimide-based monomers and the like. The monomer mixture (a") may contain two or more kinds of such other monomers.

Examples of vinyl cyanide-based monomers include acrylonitrile, methacrylonitrile, ethacrylonitrile and the like. Examples of unsaturated aliphatic acids include itaconic acid, maleic acid, fumaric acid, butenoic acid, acrylic acids, methacrylic acids and the like. Examples of the acrylamide-based monomers include acrylamides, methacrylamides, N-methyl acrylamide and the like. Examples of maleimide-based monomers include N-methylmaleimide, N-ethylmaleimide, N-isopropylmaleimide, N-butylmaleimide, N-hexylmaleimide, N-octylmaleimide, N-dodecylmaleimide, N-cyclohexylmaleimide, N-phenylmaleimide and the like.

The graft copolymer (A) is usually composed of a component soluble in acetone and a component insoluble in acetone.

The number-average molecular weight of the acetone-soluble component in the graft copolymer (A) is not limited to any particular value, and is preferably 30,000 or more, more preferably 35,000 or more. The value of 30,000 or more as the number-average molecular weight of the acetone-soluble component in the graft copolymer (A) makes it possible to further enhance the impact resistance.

On the other hand, the number-average molecular weight of the acetone-soluble component in the graft copolymer (A) is preferably 60,000 or less, more preferably 50,000 or less. The value of 60,000 or less as the number-average molecular weight of the acetone-soluble component in the graft copolymer (A) makes it possible to further enhance the flowability of the styrene-based thermoplastic resin composition.

The number-average molecular weight of the acetone-soluble component in the graft copolymer (A) can be determined as follows: a filtrate obtained by filtering the acetone-insoluble components off in the graft copolymer (A) is concentrated using a rotary evaporator to yield an acetone-soluble component sample; approximately 0.03 g of the sample is dissolved in approximately 15 g of tetrahydrofuran to prepare an approximately 0.2 mass % solution. This solution is used for measurement to yield a GPC chromatogram, which is used for determination in terms of polymethyl methacrylate as a standard substance. In this regard, the GPC measurement can be performed under the following conditions:

Measurement device: Waters 2695
Column temperature: 40° C.
Detector: RI2414 (differential refractometer)
Carrier eluent flow rate: 0.3 ml/min (solvent: tetrahydrofuran)
Column: TSKgel SuperHZM-M (6.0 mm I.D.×15 cm) and TSKgel SuperHZM-N (6.0 mm I.D.×15 cm) in series (both manufactured by Tosoh Corporation).

The graft ratio of the graft copolymer (A) is not limited to any particular value, and is preferably 10% or more and 100% or less, from the viewpoint of enhancing the impact resistance.

The graft ratio of the graft copolymer (A) is determined by the following method. First, 80 ml of acetone is added to approximately 1 g of graft copolymer (A), and the resulting mixture is refluxed in a hot-water bath at 70° C. for three hours. Centrifuging this solution at 12000 r.p.m. for 20 minutes is followed by filtering the insoluble component off to yield an acetone-insoluble component. The resulting acetone-insoluble component is dried under reduced pressure at 80° C. for five hours, the mass of the resulting component is then measured (as n in equation (1)), and the graft ratio is calculated using the following equation. m is the mass of the graft copolymer (A) sample used, and X is the amount (mass %) of the conjugated diene rubbery polymer contained in the graft copolymer (A).

$$\text{Graft Ratio (\%)} = \{[(n)-((m)\times X/100)]/[(m)\times X/100]\}\times 100 \quad (1)$$

In addition, the graft-polymerized polymer is that in which the difference in the refractive index between the portion combined by the graft-polymerization and the conjugated-diene-based rubber portion is preferably 0.03 or less, more preferably 0.01 or less. Reducing, to 0.03 or less, the difference in the refractive index between the portion combined by graft-polymerization and the conjugated-diene-based rubber portion in the graft copolymer (A) makes it possible to further enhance the transparency.

The refractive index of the portion combined by graft-polymerization in the graft copolymer (A) depends mainly on the composition of the monomers as raw materials and, thus, selecting the kinds and composition ratios of the monomers suitably makes it possible to controlling the refractive index in a desired range. In particular, when emulsion polymerization is used to control the high-molecular-weight polymer conversion ratio to 95% or more, the content ratio of a structural unit that is contained in the portion combined by grafting and is derived from each monomer used for the monomer mixture (a) is the same as the composition ratio or blending ratio of each monomer used for the monomer mixture (a).

In such a manner, the refractive index of the portion combined by graft-polymerization in the graft copolymer (A) can be estimated on the basis of the refractive indices and amounts of the monomers contained in the monomer mixture (a). For example, for a copolymer of styrene, methyl methacrylate, and n-butyl acrylate, an estimation of the refractive index of the portion combined by graft-polymerization in the graft copolymer (A) can be based on equation (2):

$$nD(G)=(1.595\times MS/100)+(1.490\times MM/100)+(1.460\times MB/100) \quad (2).$$

nD(G) represents the refractive index of the portion combined by graft-polymerization in the graft copolymer (A), MS represents the styrene content (mass %), MM represents the methyl methacrylate content (mass %), and MB represents the n-butyl acrylate content (mass %). 1.595 represents the refractive index of polystyrene, 1.490 represents the refractive index of poly(methyl methacrylate), and 1.460 represents the refractive index of poly(n-butyl acrylate). In this regard, the refractive index of each of polystyrene, poly(methyl methacrylate), and poly(n-butyl acrylate) can be measured using an Abbe's refractometer.

To produce the graft copolymer (A), emulsion polymerization is preferably used because such a method has a high degree of freedom for the particle diameter of the conjugated-diene-based rubber, allows heat generated during polymerization to be easily removed, and allows the polymerization stability of the polymer to be easily controlled.

When the graft copolymer (A) is produced by emulsion polymerization, feeding the conjugated-diene-based rubber and the monomer mixture (a) is not limited to any particular method. For example, all these may be fed in a lump initially, part of the monomer mixture (a) may be continuously fed, considering the reactivity of each monomer, or part or all of the monomer mixture (a) may be fed in installments. Feeding part of the monomer mixture (a) continuously means feeding part of the monomer mixture (a) initially followed by feeding the rest sequentially and continuously. In addition, feeding the monomer mixture (a) in installments means feeding the monomer mixture (a) initially and at a later point of time. In this regard, the respective composition ratios of the respective monomers during the respective feeding times may be the same or different.

When the graft copolymer (A) is produced by emulsion polymerization, any kind of surfactant may be used as an emulsifier. A particularly preferable kind of surfactant is an anion-based surfactant such as of a carboxylic acid salt, sulfuric acid ester salt, or sulfonic acid salt, and two or more kinds of anion-based surfactants may be used in combination. In this regard, examples of salts mentioned here include: alkali metal salts such as sodium salt, lithium salt, and potassium salt; ammonium salt; and the like.

Examples of carboxylic acid salt emulsifiers include caprylic acid salt, capric acid salt, lauryl acid salt, myristic acid salt, palmitic acid salt, stearic acid salt, oleic acid salt, linoleic acid salt, linolenic acid salt, rhodinic acid salt, behenic acid salt, dialkylsulfosuccinic acid salt and the like.

Examples of sulfuric acid ester salt emulsifiers include castor oil sulfuric acid ester salt, lauryl alcohol sulfuric acid ester salt, polyoxyethylene lauryl sulfuric acid salt, polyoxyethylene alkyl ether sulfuric acid salt, polyoxyethylene alkylphenyl ether sulfuric acid salt and the like.

Examples of sulfonic acid salt emulsifiers include dodecylbenzene sulfonic acid salt, alkylnaphthalene sulfonic acid salt, alkyldiphenyl ether disulfonic acid salt, naphthalene sulfonic acid salt condensate and the like.

When the graft copolymer (A) is produced by emulsion polymerization, an initiator may be added, if necessary. Examples of initiators include peroxides, azo-based compounds, water-soluble potassium persulfate and the like, and these may be used in combination of two or more kinds thereof. In addition, a redox-based initiator may be used as the initiator.

Examples of peroxides include benzoyl peroxide, cumene hydroperoxide, dicumyl peroxide, diisopropyl benzene hydroperoxide, t-butylhydroperoxide, t-butyl peroxyacetate, t-butyl peroxybenzoate, t-butylisopropyl carbonate, di-t-butyl peroxide, t-butyl peroxyoctate, 1,1-bis(t-butylperoxy)3,3,5-trimethylcyclohexane, 1,1-bis(t-butylperoxy)cyclohexane, t-butylperoxy-2-ethylhexanoate and the like. Among these, peroxides that are particularly preferably used are cumene hydroperoxide, 1,1-bis(t-butylperoxy)3,3,5-trimethyl cyclohexane, and 1,1-bis(t-butylperoxy)cyclohexane.

Examples of azo-based compounds include azobisisobutyronitrile, azobis(2,4-dimethyl)valeronitrile, 2-phenylazo-2,4-dimethyl-4-methoxyvaleronitrile, 2-cyano-2-propylazoformamide, 1,1'-azobiscyclohexane-1-carbonitrile, azobis (4-methoxy-2,4-dimethyl)valeronitrile, dimethyl 2,2'-azobisisobutyrate, 1-t-butylazo-2-cyanobutane, 2-t-butylazo-2-cyano-4-methoxy-4-methylpentane and the like. Among the azo-based compounds, 1,1'-azobiscyclohexane-1-carbonitrile is particularly preferably used.

The amount of an initiator to be used to produce the graft copolymer (A) is not limited to any particular value, and is preferably 0.05 part by mass or more and 0.5 part by mass or less with respect to 100 parts by mass of the total of the conjugated-diene-based rubber and the monomer mixture (a) from the viewpoint of ease of adjusting the number-average molecular weight of the graft copolymer (A) within the above-mentioned range.

In production of the graft copolymer (A), a chain transfer agent may be used. Using a chain transfer agent makes it possible to easily adjust the graft ratio within a desired range. Examples of chain transfer agents include: (i) mercaptans such as n-octylmercaptan, t-dodecylmercaptan, n-dodecylmercaptan, n-tetradecylmercaptan, and n-octadecylmercaptan; (ii) terpenes such as terpinolene; and the like, and these may be used in combination of two or more kinds thereof. Among the chain transfer agents, n-octylmercaptan and t-dodecylmercaptan are preferably used.

The amount of a chain transfer agent to be used to produce the graft copolymer (A) is not limited to any particular value. From the viewpoint of ease of adjusting the graft ratio of the graft copolymer (A) within the above-mentioned range, the addition amount of a chain transfer agent to be used to produce the graft copolymer (A) is preferably 0.2 part by mass or more, more preferably 0.4 part by mass or more, and preferably 0.8 part by mass or less, more preferably 0.7 part by mass or less, with respect to 100 parts by mass of the total of the conjugated-diene-based rubber and the monomer mixture (a).

When the graft copolymer (A) is produced by emulsion polymerization, the polymerization temperature is not limited to any particular value, and is preferably 40° C. or more and 80° C. or less from the viewpoint of emulsification stability.

When the graft copolymer (A) is produced by emulsion polymerization, it is common that a coagulating agent is added to a graft copolymer latex to collect the graft copolymer (A). An acid or a water-soluble salt is preferably used as a coagulating agent.

Examples of acids to be used as coagulating agents include sulfuric acid, hydrochloric acid, phosphoric acid, acetic acid and the like. Examples of water-soluble salts to be used as coagulating agents include calcium chloride, magnesium chloride, barium chloride, aluminium chloride, magnesium sulfate, aluminium sulfate, aluminium ammonium sulfate, aluminium potassium sulfate, aluminium sodium sulfate and the like. These may be used in combination two or more kinds thereof. The emulsifier is preferably not allowed to remain in the styrene-based thermoplastic resin composition, from the viewpoint of enhancing the color tone of the molding. Because of this, it is preferable that an alkali fatty acid salt is used as the emulsifier for acid coagulation, and then neutralized, for example, with an alkali such as sodium hydroxide so that the emulsifier can be removed.

The vinyl-based copolymer (B") obtained from the monomer mixture (b") that is a monomer mixture (b) as used herein as a monomer mixture containing a methacrylic acid ester-based monomer will be described.

The vinyl-based copolymer (B") contains at least an aromatic vinyl-based monomer, a methacrylic acid ester-based monomer, and a vinyl cyanide-based monomer, and is obtained by polymerizing the monomer mixture (b") containing substantially no acrylic acid ester-based monomer. The monomer mixture (b") may further contain another monomer that can be copolymerized.

For examples of the aromatic vinyl-based monomer contained in the monomer mixture (b"), refer to the above description of the monomer mixture (a"). Among others, styrene is preferable.

The amount of the aromatic vinyl-based monomer contained in the monomer mixture (b") is preferably 5 mass % or more, more preferably 10 mass % or more, still more preferably 20 mass % or more, with respect to 100 mass % of the total of the monomer mixture (b") from the viewpoint of further enhancing the flowability, stiffness, and transparency of the styrene-based thermoplastic resin composition. On the other hand, the amount of the aromatic vinyl-based monomer contained in the monomer mixture (b") is preferably 40 mass % or less, more preferably 35 mass % or less, still more preferably 30 mass % or less, with respect to 100 mass % of the total of the monomer mixture (b"), from the viewpoint of enhancing the impact resistance and transparency.

For examples of the methacrylic acid ester-based monomer contained in the monomer mixture (b"), refer to the above description of the monomer mixture (a"). Among others, methyl methacrylate is preferable.

The amount of the methacrylic acid ester-based monomer contained in the monomer mixture (b") is preferably 30 mass % or more, more preferably 50 mass % or more, still more preferably 60 mass % or more, with respect to 100 mass % of the total of the monomer mixture (b"), from the viewpoint of enhancing the transparency. On the other hand, the amount of the methacrylic acid ester-based monomer contained in the monomer mixture (b") is preferably 85 mass % or less, more preferably 80 mass % or less, still more preferably 75 mass % or less, with respect to 100 mass % of the total of the monomer mixture (b"), from the viewpoint of further enhancing the transparency.

The monomer mixture (b") contains substantially no acrylic acid ester-based monomer. The monomer mixture (b") preferably contains completely no acrylic acid ester-based monomer. Containing substantially no such monomer refers to exhibiting no carbon signal attributed to a structural unit derived from an acrylic acid ester-based monomer, as observed according to the below-mentioned analysis method.

Examples of the vinyl cyanide-based monomer contained in the monomer mixture (b") include acrylonitrile, methacrylonitrile, ethacrylonitrile and the like, and the monomer mixture may contain two or more kinds of these. Among these, acrylonitrile is preferably used from the viewpoint of further enhancing the impact resistance.

The amount of the vinyl cyanide-based monomer contained in the monomer mixture (b") is preferably 2 mass % or more, more preferably 3 mass % or more, with respect to 100 mass % of the total of the monomer mixture (b"), from the viewpoint of further enhancing the impact resistance. On the other hand, the amount of the vinyl cyanide-based monomer contained in the monomer mixture (b") is preferably 20 mass % or less, more preferably 10 mass % or less, still more preferably 5 mass % or less, with respect to 100 mass % of the total of the monomer mixture (b"), from the viewpoint of enhancing the color tone of the molding.

In addition, another copolymerizable monomer that can be contained in the monomer mixture (b") is not limited to any particular such monomer provided that such a monomer does not impair the desired effects. Examples of such another monomer include unsaturated aliphatic acids, acrylamide-based monomers, maleimide-based monomers and the like, and the monomer mixture may contain two or more kinds of these. Examples of unsaturated aliphatic acids include itaconic acid, maleic acid, fumaric acid, butenoic acid, acrylic acids, methacrylic acids and the like. Examples of acrylamide-based monomers include acrylamides, methacrylamides, N-methyl acrylamide and the like. Examples of maleimide-based monomers include N-methylmaleimide, N-ethylmaleimide, N-isopropylmaleimide, N-butylmaleimide, N-hexylmaleimide, N-octylmaleimide, N-dodecylmaleimide, N-cyclohexylmaleimide, N-phenylmaleimide and the like.

Allowing the resin composition to contain the graft copolymer (A") having an unsaturated alkyl carboxylate compound used as a monomer and contain the vinyl-based copolymer (B") makes it possible to enhance the transparency significantly.

The number-average molecular weight of the vinyl-based copolymer (B) is not limited to any particular value, and is preferably 40,000 or more, more preferably 50,000 or more. The value of 40,000 or more as the number-average molecular weight of the vinyl-based copolymer (B) makes it possible to further enhance the impact resistance. On the other hand, the number-average molecular weight of the vinyl-based copolymer (B) is preferably 100,000 or less, more preferably 70,000 or less. The value of 100,000 or less as the number-average molecular weight of the vinyl-based copolymer (B) makes it possible to further enhance the flowability of the styrene-based thermoplastic resin composition. The vinyl-based copolymer (B) having a number-average molecular weight in the range of 40,000 or more and 100,000 or less can be easily produced, for example, through using the below-mentioned initiator and chain transfer agent and controlling the polymerization temperature in the below-mentioned preferable range.

The number-average molecular weight of the vinyl-based copolymer (B) can be determined as follows: an approximately 0.2 mass % solution of approximately 0.03 g of the vinyl-based copolymer (B) dissolved in approximately 15 g of tetrahydrofuran is used for measurement to yield a GPC chromatogram, which is used for determination in terms of polymethyl methacrylate as a standard substance. In this regard, the GPC measurement can be performed under the following conditions:

Measurement device: Waters 2695
Column temperature: 40° C.
Detector: RI2414 (differential refractometer)
Carrier eluent flow rate: 0.3 ml/min (solvent: tetrahydrofuran)
Column: TSKgel SuperHZM-M (6.0 mm I.D.×15 cm) and TSKgel SuperHZM-N (6.0 mm I.D.×15 cm) in series (both manufactured by Tosoh Corporation).

The refractive index of the vinyl-based copolymer (B) is that in which the above-mentioned difference in the refractive index from the conjugated-diene-based rubber is preferably 0.03 or less, more preferably 0.01 or less. Reducing, to 0.03 or less, the difference in the refractive index between the vinyl-based copolymer (B) and the conjugated-diene-based rubber makes it possible to enhance the transparency and color tone.

The refractive index of the vinyl-based copolymer (B) depends mainly on the composition of a vinyl-based monomer as a raw material, and thus, selecting the kind and composition ratio of the monomer suitably makes it possible to controlling the refractive index in a desired range. In this regard, the refractive index of the vinyl-based copolymer (B) can be estimated from the refractive index and amount of the monomer. For example, when the copolymer is composed of styrene, acrylonitrile, and methyl methacrylate, the refractive index of the vinyl-based copolymer (B) can be estimated in accordance with equation (3):

$$nD(B)=(1.510 \times MA/100)+(1.595 \times MS/100)+(1.490 \times MM/100) \quad (3).$$

nD(B) represents the refractive index of the vinyl-based copolymer (B), MA represents the acrylonitrile content (mass %), MS represents the styrene content (mass %), and MM represents the methyl methacrylate content (mass %). 1.510 represents the refractive index of polyacrylonitrile, 1.595 represents the refractive index of polystyrene, and 1.490 represents the refractive index of poly(methyl methacrylate). In this regard, the refractive index of each of polyacrylonitrile, polystyrene, and poly(methyl methacrylate) can be measured using an Abbe's refractometer.

In addition, the refractive index of the vinyl-based copolymer (B) can be measured using an Abbe's refractometer.

A method of obtaining the vinyl-based copolymer (B) is not limited to any particular such method, and continuous mass polymerization or continuous solution polymerization is preferably used from the viewpoint of the flowability, transparency, and color tone of a styrene-based thermoplastic resin composition to be obtained. Continuous mass polymerization is a method in which a monomer mixture is introduced sequentially and continuously, and the mass-polymerized vinyl-based copolymer is discharged sequentially and continuously. Continuous solution polymerization is a method in which a monomer mixture and a solvent are introduced sequentially and continuously, and a solution composed of the solution-polymerized vinyl-based copolymer and the solvent are discharged sequentially and continuously.

A method to be adopted for producing the vinyl-based copolymer (B) by continuous mass polymerization or continuous solution polymerization can be any such method, and examples include a method in which polymerizing the monomer mixture (b) in a polymerization vessel is followed by demonomerization (desolvation and devolatilization).

Examples of polymerization vessels that can be used include: mixing type polymerization vessels having an agitating blade such as a paddle blade, turbine blade, propeller blade, brumargin blade, multistage blade, anchor blade, Maxblend blade, or double-helical blade; various column type reactors; and the like. In addition, a multitube reactor, kneader type reactor, a twin screw extruder, or the like can be used as a polymerization reactor (for example, see "Assessment of Impact-resistant Polystyrene," *Assessment of Polymer Production Process*, 10, The Society of Polymer Science, Japan (Jan. 26, 1989)).

When the vinyl-based copolymer (B) is produced, two or more above-mentioned polymerization vessels or polymerization reactors (vessels) may be used, and, if necessary, two or more kinds of polymerization vessels or polymerization reactors may be combined. From the viewpoint of decreasing the dispersity of the vinyl-based copolymer (B), the number of the polymerization vessels or polymerization reactors (vessels) is preferably two or less, and a single-vessel complete mixing type reactor is more preferable.

The reaction mixture obtained by polymerization in the above-mentioned polymerization vessel or polymerization reactor is usually supplied in a demonomerization step subsequently, and from the reaction mixture, monomers, solvents, and other volatile components are removed. Examples of methods of demonomerization include: a method in which a single screw or twin screw extruder having a vent is used to remove a volatile component through the vent hole under heating, under normal pressure, or under reduced pressure; a method in which an evaporator having a heater of a plate-fin type such as a centrifugal type built in a drum is used to remove a volatile component; a method in which a thin-film evaporator such as of a centrifugal type is used to remove a volatile component; a method in which a multipipe heat exchanger is used for preheating and foaming, and the material is flushed into a vacuum chamber to remove a volatile component; and the like. Among the methods of demonomerization, a method to be preferably used is particularly a method in which a single screw or twin screw extruder having a vent is used to remove a volatile component.

In production of the vinyl-based copolymer (B), an initiator or a chain transfer agent may be used suitably. Examples of such initiators and chain transfer agents include the same initiators and the same chain transfer agents as in the description of the method of producing the graft copolymer (A).

The amount of an initiator to be used to produce the vinyl-based copolymer (B) is not limited to any particular value, and is preferably 0.01 part by mass or more and 0.03 part by mass or less with respect to 100 parts by mass of the total of the monomer mixture (b) from the viewpoint of ease of adjusting the number-average molecular weight of the vinyl-based copolymer (B) within the above-mentioned range.

The amount of a chain transfer agent to be used to produce the vinyl-based copolymer (B) is not limited to any particular value, and is preferably 0.05 part by mass or more and 0.30 part by mass or less with respect to 100 parts by mass of the total of the monomer mixture (b) from the viewpoint of ease of adjusting the number-average molecular weight of the vinyl-based copolymer (B) within the above-mentioned range.

When the vinyl-based copolymer (B) is produced by continuous mass polymerization or continuous solution polymerization, the polymerization temperature is not limited to any particular value, and is preferably 120° C. or more and 140° C. or less from the viewpoint of ease of adjusting the number-average molecular weight of the vinyl-based copolymer (B) within the above-mentioned range.

When the vinyl-based copolymer (B) is produced by continuous solution polymerization, the amount of a solvent in the polymer solution is preferably 30 mass % or less, more preferably 20 mass % or less, from the viewpoint of productivity. A solvent to be used is preferably ethyl benzene or methyl ethyl ketone, particularly preferably ethyl benzene, from the viewpoint of polymerization stability.

The vinyl-based copolymer (B) contains substantially no structural unit derived from an acrylic acid ester-based monomer, preferably does not contain any such unit. The amount of a structural unit derived from an acrylic acid ester-based monomer can be determined by a $^{13}$C-NMR analysis, and determined from the area of a carbon signal attributed to the structural unit derived from an acrylic acid ester-based monomer. For example, when n-butyl acrylate is used, a peak of 64 ppm attributed to the carbon in O—CH$_2$— of the alkoxy group can be used as an index. In addition, an analysis means such as a GC/MS method can be suitably used in combination for such determination. Containing substantially no such monomer refers to exhibiting no observed carbon signal attributed to a structural unit derived from an acrylic acid ester-based monomer. The vinyl-based copolymer (B) containing a structural unit derived from an acrylic acid ester-based monomer leads to a decrease in the impact resistance.

The measurement conditions for the $^{13}$C-NMR are listed below.

Device: ECA-400 manufactured by JEOL RESONANCE Co., Ltd.
Measurement method: single $^{13}$C pulse with inverse gated$^1$H decoupling
Observation frequency: 100.53 MHz
Solvent: chloroform-d
Concentration: 100 mg/0.65 ml (sample/chloroform-d)
Chemical shift standard: Me$_4$Si
Temperature: room temperature
Observation width: 25126 Hz
Data point: 32768
Pulse width: 4.66 μs
Delay time: 10.0 s
Cumulated number of times: 5000 times
Rotational frequency of sample: 15.0 Hz In our styrene-based thermoplastic resin composition, it is preferable that the amount of the graft copolymer (A) is 10 parts by mass or more and 50 parts by mass or less, and the amount of the vinyl-based copolymer (B) is 50 parts by mass or more and 90 parts by mass or less, with respect to 100 parts by mass of the total of the graft copolymer (A) and the vinyl-based copolymer (B). Having 10 parts by mass or more of the graft copolymer (A) and 90 parts by mass or less of the vinyl-based copolymer (B) makes it possible to inhibit the impact resistance from decreasing. It is more preferable that the amount of the graft copolymer (A) is 20 parts by mass or more, and the amount of the vinyl-based copolymer (B) is 80 parts by mass or less, with respect to 100 parts by mass of the total of the graft copolymer (A) and the vinyl-based copolymer (B). In addition, having 70 parts by mass or less of the graft copolymer (A) and 30 parts by mass or more of the vinyl-based copolymer (B) makes it possible to inhibit the melt viscosity of the styrene-based thermoplastic resin composition from increasing, inhibit the flowability from decreasing, and inhibit the color tone from decreasing, and thus is preferable. In addition, having 70 parts by mass or less of the graft copolymer (A") and 30 parts by mass or more of the vinyl-based copolymer (B") enables the transparency to be good. It is more preferable that the amount of the graft copolymer (A) is 40 parts by mass or less, and the amount of the vinyl-based copolymer (B) is 60 parts by mass or more, with respect to 100 parts by mass of the total of the graft copolymer (A) and the vinyl-based copolymer (B).

With use of the graft copolymer (A") and the vinyl-based copolymer (B"), the styrene-based thermoplastic resin composition is transparent. Being transparent means having a haze (haze) of 5 or less with a rectangular plate molding having a thickness of 3 mm.

A rectangular plate molding having a thickness of 3 mm is obtained as follows: resin composition pellets are dried in a hot-air dryer at 80° C. for three hours, and then supplied into a molding machine SE-50DU manufactured by Sumitomo Heavy Industries, Ltd. with the cylinder temperature set at 230° C.; and the pellets are molded. In addition, the haze of the resulting rectangular plate molding is measured using a direct-reading haze meter manufactured by Toyo Seiki Seisaku-sho, Ltd.

In our styrene-based thermoplastic resin composition, the acetone-insoluble component preferably contains a structural unit derived from an acrylic acid ester-based monomer. Whether the acetone-insoluble component contains a unit derived from an acrylic acid ester-based monomer can be verified by observing a carbon signal attributed to a structural unit derived from an acrylic acid ester-based monomer in the below-mentioned $^{13}$C solid NMR analysis of an acetone-insoluble component. For example, when n-butyl acrylate is used, a peak can be observed at 15 ppm attributed to the carbon in CH$_3$ located at an end of the alkoxy group. In addition, an analysis means such as a GC/MS method can be suitably used in combination for such determination. The acetone-insoluble component containing a structural unit derived from an acrylic acid ester-based monomer leads to further enhancing the flowability of the styrene-based thermoplastic resin composition. In addition, allowing the content ratio (d1) of a structural unit derived from an acrylic acid ester-based monomer to be 1 mass % or more in the acetone-insoluble component leads to further enhancing the flowability of the styrene-based thermoplastic resin composition. On the other hand, allowing the content ratio (d1) of a structural unit derived from an acrylic acid ester-based monomer to be 7 mass % or less in the acetone-insoluble component makes it possible to further inhibit the impact resistance from decreasing.

The amount of the acrylic acid ester-based monomer unit in the acetone-insoluble component in the styrene-based thermoplastic resin composition can be determined by the following method. First, 80 ml of acetone is added to approximately 1 g of styrene-based thermoplastic resin composition, the resulting mixture is refluxed in a hot-water bath at 70° C. for three hours, this solution is centrifuged at 12000 r.p.m. for 20 minutes, and then, the insoluble component is filtrated to yield an acetone-insoluble component. The resulting acetone-insoluble component is dried under reduced pressure at 80° C. for five hours.

The resulting acetone-insoluble component undergoes a $^{13}$C solid NMR analysis, and the component ratio is calculated from the area ratio of each peak appearing on the spectral chart of NMR.

The measurement conditions for the $^{13}C$ solid NMR are listed below.

Device: CMX-300 Infinity manufactured by Chemagnetics, Inc.
Measurement method: DD/MAS
Observation frequency: 75.18829 MHz
Chemical shift standard: polydimethyl siloxane
Temperature: 100° C.
Observation width: 30003 Hz
Data point: 16384
Pulse width: 4.2 μs
Delay time: 140 s
Cumulated number of times: 1200 times
Rotational frequency of sample: 10.0 kHz The ratio (d2/d3) is preferably 4 to 75 between the following: the content ratio (d2, mass %) of a structural unit derived from an acrylic acid ester-based monomer in an acetone-insoluble component in the styrene-based thermoplastic resin composition, with respect to 100 mass % of the mass obtained by subtracting the mass corresponding to the conjugated-diene-based rubber contained in the insoluble component from the mass of the insoluble component; and the content ratio (d3, mass %) of a structural unit derived from an acrylic acid ester-based monomer in an acetone-soluble component in the styrene-based thermoplastic resin composition, with respect to 100 mass % of the soluble component. This ratio (d2/d3) of 4 or more makes it possible to maintain the impact resistance, and at the same time, further enhance the flowability of the styrene-based thermoplastic resin composition. On the other hand, this ratio (d2/d3) of 75 or less makes it possible to maintain the flowability of the styrene-based thermoplastic resin composition, and at the same time, further enhance the impact resistance.

The content ratio (d2, mass %) of a structural unit derived from an acrylic acid ester-based monomer in an acetone-insoluble component, with respect to 100 mass % of the mass obtained by subtracting the mass corresponding to the conjugated-diene-based rubber contained in the acetone-insoluble component from the mass of the insoluble component, is determined as the component ratio, as follows: a $^{13}C$ solid NMR analysis is performed under the same conditions as adopted for determination of the content ratio of a structural unit derived from an acrylic acid ester-based monomer contained in the acetone-insoluble component; the component ratio is calculated from the area ratio of each peak appearing on the spectral chart of NMR.

In addition, the content ratio (d3, mass %) of a structural unit derived from an acrylic acid ester-based monomer, with respect to 100 mass % of an acetone-soluble component in the styrene-based thermoplastic resin composition, can be determined by the following method.

First, 80 ml of acetone is added to approximately 1 g of styrene-based thermoplastic resin composition, the resulting mixture is refluxed in a hot-water bath at 70° C. for three hours, this solution is centrifuged at 12000 r.p.m. for 20 minutes, the insoluble component is then filtrated, and the filtrate is concentrated using a rotary evaporator to yield an acetone-soluble component. The resulting acetone-soluble component is dried under reduced pressure at 80° C. for five hours.

The resulting acetone-soluble component undergoes a $^{13}C$-NMR analysis under the same conditions as above-mentioned, and the component ratio is calculated from the area ratio of each peak appearing on the spectral chart of NMR.

The styrene-based thermoplastic resin composition contains a component insoluble in acetone, the acetone-insoluble component contains a structural unit derived from an acrylic acid ester-based monomer, and the content ratio (d1) of the structural unit is adjusted within the above-mentioned range. The ratio (d2/d3) is between the following: the content ratio (d2, mass %) of a structural unit derived from the acrylic acid ester-based monomer in the acetone-insoluble component, with respect to 100 mass % of the mass obtained by subtracting the mass corresponding to the conjugated-diene-based rubber contained in the acetone-insoluble component from the mass of the acetone-insoluble component; and the content ratio (d3, mass %) of a structural unit derived from the acrylic acid ester-based monomer in an acetone-soluble component in the styrene-based thermoplastic resin composition, with respect to 100 mass % of the soluble component. In a method of controlling the ratio (d2/d3) within the above-mentioned range, the graft copolymer (A) is prepared, for example, considering the copolymerization composition ratios of the monomers to be added, and optionally adjusting the feed of the monomer mixture (a), and a styrene-based thermoplastic resin composition composed of the graft copolymer (A) and the vinyl-based copolymer (B) can be used to achieve such a ratio.

Additionally, the graft copolymer (A) contains a component insoluble in acetone, and the ratio (d4/d5) is preferably 2.0 or less between the following: the content ratio (d4, mass %) of a structural unit derived from the acrylic acid ester-based monomer in the acetone-insoluble component, with respect to 100 mass % of the mass obtained by subtracting the mass corresponding to the conjugated-diene-based rubber contained in the insoluble component from the mass of the insoluble component; and the content ratio (d5, mass %) of a structural unit derived from the acrylic acid ester-based monomer in an acetone-soluble component, with respect to 100 mass % of the mass of the soluble component contained in the graft copolymer (A). This ratio (d4/d5) of 2.0 or less makes it possible to further enhance the flowability and impact resistance of the styrene-based thermoplastic resin composition.

The ratio (d4/d5) is between the following: the content ratio (d4, mass %) of a structural unit derived from the acrylic acid ester-based monomer in the acetone-insoluble component in the graft copolymer (A), with respect to 100 mass % of the mass obtained by subtracting the mass corresponding to the conjugated-diene-based rubber contained in the insoluble component from the mass of the insoluble component; and the content ratio (d5, mass %) of a structural unit derived from the acrylic acid ester-based monomer contained in an acetone-soluble component, with respect to 100 mass % of the mass of the soluble component contained in the graft copolymer (A). Such a ratio (d4/d5) can be determined by the following method. First, 80 ml of acetone is added to approximately 1 g of the graft copolymer (A), the resulting mixture is refluxed in a hot-water bath at 70° C. for three hours, this solution is centrifuged at 12000 r.p.m. for 20 minutes, and then, the insoluble component is filtrated to yield an acetone-insoluble component. In addition, the filtrate is concentrated using a rotary evaporator to yield an acetone-soluble component. The resulting acetone-insoluble component and acetone-soluble component are each dried under reduced pressure at 80° C. for five hours.

This content ratio (d4, mass %) of a structural unit derived from an acrylic acid ester-based monomer in the acetone-insoluble component, with respect to 100 mass % of the mass obtained by subtracting the mass corresponding to the conjugated-diene-based rubber from the mass of the insoluble component, is determined as the component ratio, as follows: a $^{13}$C solid NMR analysis is performed on the resulting acetone-insoluble component under the same conditions as above-mentioned; the component ratio is calculated from the area ratio of each peak appearing on the spectral chart of NMR.

In addition, the resulting acetone-soluble component undergoes a $^{13}$C-NMR analysis under the same conditions as above-mentioned, and from a peak intensity ratio of each peak appearing on the spectral chart of NMR, the amount (d5) of an acrylic acid ester-based monomer unit with respect to 100 mass % of the acetone-soluble component in the graft copolymer (A) can be quantitated.

The ratio (d4/d5) is between the following: the content ratio (d4, mass %) of a structural unit derived from the acrylic acid ester-based monomer in the acetone-insoluble component contained in the graft copolymer (A), with respect to 100 mass % of the mass obtained by subtracting the mass corresponding to the conjugated-diene-based rubber contained in the insoluble component from the mass of the insoluble component; and the content ratio (d5, mass %) of a structural unit derived from the acrylic acid ester-based monomer in an acetone-soluble component, with respect to 100 mass % of the mass of the soluble component contained in the graft copolymer (A). In a method of controlling the ratio (d4/d5) within the above-mentioned range, the graft copolymer (A) is prepared, for example, considering the copolymerization composition ratios of the monomers to be added, and suitably adjusting the feed of the monomer mixture (a), and the graft copolymer (A) can be used to achieve such a ratio.

To enhance the impact resistance and flowability without impairing the transparency, it is important to use an acrylic acid ester-based monomer having an effect of lowering the glass transition temperature.

When a structural unit derived from an acrylic acid ester-based monomer is introduced into the acetone-insoluble component in the graft copolymer (A), the glass transition temperature of the portion combined by graft polymerization in the graft-polymerized polymer can be decreased.

When a structural unit derived from the acrylic acid ester-based monomer is introduced into the acetone-soluble component in the graft copolymer (A), the polymer thus produced has a low glass transition temperature and high flowability, and thus, has good dispersibility for the vinyl-based copolymer (B), making it possible to enhance the flowability of the styrene-based resin composition.

The ratio (d4/d5) is between the following: the content ratio (d4, mass %) of a structural unit derived from the acrylic acid ester-based monomer in the acetone-insoluble component contained in the graft copolymer (A), with respect to 100 mass % of the mass obtained by subtracting the mass corresponding to the conjugated-diene-based rubber contained in the insoluble component from the mass of the insoluble component; and the content ratio (d5, mass %) of a structural unit derived from the acrylic acid ester-based monomer in an acetone-soluble component, with respect to 100 mass % of the mass of the soluble component contained in the graft copolymer (A). Having the ratio (d4/d5) at 2.0 or less makes it possible to achieve both the dispersibility and flowability at an even higher level, and enhance the impact resistance.

With respect to 100 mass % of the mass of a styrene-based thermoplastic resin composition, the amount of the acrylic acid ester-based homopolymer is 0.0 mass % to 0.5 mass %.

The acrylic acid ester-based homopolymer means a polymer composed of only an acrylic acid ester-based monomer. When the acrylic acid ester-based homopolymer content is more than 0.5 mass %, the impact resistance is decreased in some instances. In this regard, it is preferable that a styrene-based thermoplastic resin composition does not contain, that is, contains 0.0 mass % of an acrylic acid ester-based homopolymer.

The amount of the acrylic acid ester-based homopolymer in the styrene-based thermoplastic resin composition can be determined by the following method.

First, 80 ml of methanol is added to approximately 2 g of freeze-pulverized styrene-based thermoplastic resin composition, the resulting mixture is refluxed in a hot-water bath at 70° C. for three hours, this solution is centrifuged at 12000 r.p.m. for 20 minutes, and then, the insoluble component is filtrated to yield a methanol-insoluble component. In addition, the filtrate is concentrated using a rotary evaporator to yield a methanol-soluble component. The resulting methanol-insoluble component and methanol-soluble component are each dried under reduced pressure at 80° C. for five hours.

Approximately 0.5 g of the resulting methanol-soluble component is dissolved in approximately 100 g of chloroform to prepare a solution, and this solution is used for GPC preparative fractionation. In this regard, the GPC preparative fractionation can be performed under the following conditions:

Measurement device: manufactured by Shimadzu Corporation
Pump: LC-6A
Fraction collector: FRC-10A
Column temperature: 45° C.
Detector: RID-10A (differential refractometer)
Carrier eluent flow rate: 2.8 ml/min (solvent: chloroform)
Column: Shodex K2002 (20.0 mm I.D.×30 cm) and Shodex K2003 (20.0 mm I.D.×30 cm) in series (both manufactured by Showa Denko K.K.).

The resulting GPC preparative fractions each undergo a $^1$H-NMR measurement. From the peak area of each signal appearing on the spectral chart of NMR, the area of a peak attributed to the acrylic acid ester-based homopolymer can be determined and quantitated. For example, the amount of an n-butyl acrylate homopolymer is calculated from the area of a peak at or near 4 ppm attributed to two hydrogen atoms of O—CH$_2$— of the alkoxy group derived from the n-butyl acrylate.

The measurement conditions for $^1$H-NMR are listed below.

Device: ECA-400 manufactured by JEOL RESONANCE Co., Ltd.
Measurement method: single pulse
Observation frequency: 399.78 MHz
Solvent: chloroform-d
Concentration: each preparative fraction/0.65 ml (sample/chloroform-d)
Chemical shift standard: Me$_4$Si
Temperature: room temperature
Observation width: 8000 Hz
Data point: 32768
Pulse width: 6.45 μs
Delay time: 15.0 s
Cumulated number of times: 64 times
Rotational frequency of sample: 15.0 Hz To the extent that the desired effects are not impaired, our styrene-based thermoplastic resin composition can contain a material, examples of which include the following: inorganic fillers such as glass fibers, glass powders, glass beads, glass flakes, alumina, alumina fibers, carbon fibers, graphite fibers, stainless steel fibers, whisker, potassium titanate fibers, wollastonite, asbestos, hard clay, calcined clay, talc, kaolin, mica, calcium carbonate, magnesium carbonate, aluminium oxide, and minerals; impact modifiers such as silicone compounds; antioxidants such as are hindered phenol-based, sulfur-containing compound-based, or phosphorus-containing organic compound-based; heat stabilizers such as are phenol-based or acrylate-based; ultraviolet absorbers such as are benzotriazole-based, benzophenone-based, or salicylate-based; hindered amine-based light stabilizers; lubricants and plasticizers such as higher fatty acids, acid esters, acid amide-based agents, and higher alcohols; release agents such as montanoic acid and salts thereof, esters thereof, half esters thereof, stearyl alcohols, stearamide, and ethylene wax; various flame retardants; flame retardant auxiliaries; color protection agents such as phosphite and hypophosphite; counteragents such as phosphoric acids, monosodium phosphate, maleic anhydride, and succinic anhydride; nucleating agents; antistatic agents such as are amine-based, sulfonic acid-based, or poly ether-based; colorants such as carbon black, pigments, and dyes; bluing agents; and the like.

Next, a method of producing our styrene-based thermoplastic resin composition will be described with reference to an example. Our styrene-based thermoplastic resin composition can be obtained, for example, by melt-kneading the above-mentioned graft copolymer (A), vinyl-based copolymer (B), and, if necessary, another component. A more preferable method includes mass-polymerizing the vinyl-based copolymer (B) continuously and further melt-kneading the graft copolymer (A) and, if necessary, another component continuously.

FIG. 1 depicts a schematic sectional view of one example of a production apparatus preferably used. As depicted in FIG. 1, this apparatus includes a reactor 1 for producing a vinyl-based copolymer (B), a preheater 2 for heating the resulting vinyl-based copolymer (B) to a predetermined temperature, and a twin screw extruder type devolatilizer 3, which are linked in this order. A twin screw extruder type feeder 5 for supplying the graft copolymer (A) is further connected to the side of the twin screw extruder type devolatilizer 3 so that the graft copolymer can be fed through the side. The reactor 1 has an agitator (helical ribbon impeller) 7, and the twin screw extruder type devolatilizer 3 has a vent port 8 for removing a volatile component such as an unreacted monomer.

The reaction product continuously supplied from the reactor 1 is heated to a predetermined temperature by the preheater 2, and then, supplied into the twin screw extruder type devolatilizer 3. A volatile component such as an unreacted monomer is removed through the vent port 8 out of the system commonly at a temperature of approximately 150 to 280° C. under normal pressure or reduced pressure in the twin screw extruder type devolatilizer 3. This removal of a volatile component is commonly performed until the volatile component reaches a predetermined amount, for example, 10 mass % or less, more preferably 5 mass % or less. In addition, the volatile component removed is preferably supplied into the reactor 1 again.

The graft copolymer (A) is supplied from the twin screw extruder type feeder 5 through the opening provided at a position on the side of, and near the downstream end of, the twin screw extruder type devolatilizer 3. The twin screw extruder type feeder 5 preferably has a heating device, and the graft copolymer (A) made semi-molten or molten is supplied into the twin screw extruder type devolatilizer 3 so that the graft copolymer (A) can be in a good mixing condition. The heating temperature for the graft copolymer (A) is commonly 100 to 220° C. Examples of the twin screw extruder type feeder 5 include a twin screw extruder type feeder composed of a screw, a cylinder, and a screw driving section, wherein the cylinder has a heating/cooling function.

At the position at which the twin screw extruder type devolatilizer 3 is connected to the twin screw extruder type feeder 5, the amount of the unreacted monomer is preferably already decreased to 10 mass % or less, more preferably 5 mass % or less, to inhibit a rubber component from being thermally degraded by a subsequent operation to remove the unreacted monomer.

The vinyl-based copolymer (B) and the graft copolymer (A) are melt-kneaded in a melt kneading zone 4 that is a region downstream of the position at which the twin screw extruder type devolatilizer 3 is connected to the twin screw extruder type feeder 5. Then, a styrene-based thermoplastic resin composition is discharged out of the system through a discharge hole 6. It is preferable that a water inlet 9 is provided on the melt kneading zone 4 and that a predetermined amount of water is added. The water injected and a volatile component such as an unreacted monomer are removed out of the system through a final vent port 10 provided further downstream.

Our styrene-based thermoplastic resin composition can be molded by an arbitrary molding method. Examples of molding methods include injection molding, extrusion molding, inflation molding, blow molding, vacuum molding, compression molding, gas-assisted molding and the like, and injection molding is preferably used. The cylinder temperature during injection molding is preferably 210° C. or more and 320° C. or less, and the mold temperature is preferably 30° C. or more and 80° C. or less.

Our styrene-based thermoplastic resin composition can be widely used in the form of a molding having an arbitrary shape. Examples of moldings include films, seats, fibers, cloths, nonwoven fabrics, injection moldings, extrusion moldings, vacuum air-pressure moldings, blow moldings, composites with other materials and the like.

Our styrene-based thermoplastic resin composition makes it possible to obtain a styrene-based thermoplastic resin composition having both excellent impact resistance and good color tone, and thus, is useful in applications such as home electric appliances, communication devices, general merchandise, and medical devices. Additionally, in a preferable aspect, the high degree of transparency is useful for applications such as home electric appliances, communication devices, general merchandise, and medical devices.

EXAMPLES

Below, our compositions, methods and molded articles will be described in further detail with reference to Examples. This disclosure is not construed to be limited to these Examples. First, evaluation methods will be described.
(1) Number-Average Molecular Weight An approximately 0.2 mass % solution of approximately 0.03 g of the sample dissolved in approximately 15 g of tetrahydrofuran was used for measurement to yield a GPC chromatogram, which was used for determination in terms of polymethyl methacrylate as a standard substance. In this regard, the GPC measurement was performed under the following conditions:
Device: Waters 2695
Column temperature: 40° C.
Detector: RI2414 (differential refractometer)
Carrier eluent flow rate: 0.3 ml/min (solvent: tetrahydrofuran)

Column: TSKgel SuperHZM-M (6.0 mm I.D.×15 cm) and TSKgel SuperHZM-N (6.0 mm I.D.×15 cm) in series (both manufactured by Tosoh Corporation).

(2) Graft Ratio of Graft Copolymer (A)

To approximately 1 g of graft copolymer (A), 80 ml of acetone was added, and the resulting mixture was refluxed in a hot-water bath at 70° C. for three hours. Centrifuging this solution at 8000 r.p.m. (10000 G) for 40 minutes was followed by filtering the insoluble component off to yield an acetone-insoluble component. The resulting acetone-insoluble component was dried under reduced pressure at 80° C. for five hours, the mass (represented by n in equation (1)) of the resulting component was then measured, and the graft ratio was calculated using the following equation. m is the mass of the graft copolymer (A) sample used, and X is the amount (mass %) of the conjugated-diene-based rubber equivalent contained in the graft copolymer (A).

$$\text{Graft Ratio (\%)} = \{[(n)-((m)\times X/100)]/[(m)\times X/100]\} \times 100 \quad (1)$$

(3) Whether Peak of Structural Unit Derived from Acrylic Acid Ester-Based Monomer Contained in Acetone-Insoluble Component in Styrene-Based Thermoplastic Resin Composition is Found in $^{13}$C Solid NMR, and Amount (d1) of Structural Unit Derived from Acrylic Acid Ester-Based Monomer To approximately 1 g of resin composition, 80 ml of acetone was added, the resulting mixture was refluxed in a hot-water bath at 70° C. for three hours, this solution was centrifuged at 12000 r.p.m. for 20 minutes, and then, the insoluble component was filtrated to yield an acetone-insoluble component. The resulting acetone-insoluble component was dried under reduced pressure at 80° C. for five hours.

The resulting acetone-insoluble component underwent a $^{13}$C solid NMR analysis, and the component ratio was calculated from the area ratio of each peak appearing on the spectral chart of NMR.

The measurement conditions for the $^{13}$C solid NMR are listed below.

Device: CMX-300 Infinity manufactured by Chemagnetics, Inc.
Measurement method: DD/MAS method
Observation frequency: 75.18829 MHz
Chemical shift standard: polydimethyl siloxane
Temperature: 100° C.
Observation width: 30003 Hz
Data point: 16384
Pulse width: 4.2 μs
Delay time: 140 s
Cumulated number of times: 1200 times
Rotational frequency of sample: 10.0 kHz (4) Content Ratio (d2, Mass %) of Structural Unit Derived from Acrylic Acid Ester-Based Monomer in Acetone-Insoluble Component in Styrene-Based Thermoplastic Resin Composition, with Respect to 100 Mass % of Mass Obtained by Subtracting Mass Corresponding to Conjugated-Diene-Based Rubber Contained in Insoluble Component from Mass of Insoluble Component The resulting acetone-insoluble component obtained by the technique in (3) above underwent a $^{13}$C solid NMR analysis under the same conditions as above-mentioned, and the component ratio was calculated from the area ratio of each peak appearing on the spectral chart of NMR.

(5) Content Ratio (d3, Mass %) of Structural Unit Derived from Acrylic Acid Ester-Based Monomer in Acetone-Soluble Component with Respect to 100 Mass % of Soluble Component in Styrene-Based Thermoplastic Resin Composition To approximately 1 g of resin composition, 80 ml of acetone was added, the resulting mixture was refluxed in a hot-water bath at 70° C. for three hours, this solution was centrifuged at 12000 r.p.m. for 20 minutes, the insoluble component was then filtrated, and the filtrate was concentrated using a rotary evaporator to yield an acetone-soluble component. The resulting acetone-soluble component was dried under reduced pressure at 80° C. for five hours.

The resulting acetone-soluble component underwent a $^{13}$C-NMR analysis, and the component ratio was calculated from the area ratio of each peak appearing on the spectral chart of NMR.

The measurement conditions for the $^{13}$C-NMR are listed below.

Device: ECA-400 manufactured by JEOL RESONANCE Co., Ltd.
Measurement method: single $^{13}$C pulse with inverse gated $^{1}$H decoupling
Observation frequency: 100.53 MHz
Solvent: chloroform-d
Concentration: 100 mg/0.65 ml (sample/chloroform-d)
Chemical shift standard: Me$_4$Si
Temperature: room temperature
Observation width: 25126 Hz
Data point: 32768
Pulse width: 4.66 μs
Delay time: 10.0 s
Cumulated number of times: 5000 times
Rotational frequency of sample: 15.0 Hz (6) Content Ratio (d4, Mass %) of Structural Unit Derived from Acrylic Acid Ester-Based Monomer, with Respect to 100 Mass % of Mass Obtained by Subtracting Mass Corresponding to Conjugated-Diene-Based Rubber Contained in Acetone-Insoluble Component Contained in Graft Copolymer (A) from Mass of Insoluble Component To approximately 1 g of the graft copolymer (A), 80 ml of acetone was added, the resulting mixture was refluxed in a hot-water bath at 70° C. for three hours, this solution was centrifuged at 12000 r.p.m. for 20 minutes, and then, the insoluble component was filtrated to yield an acetone-insoluble component. In addition, the filtrate was concentrated using a rotary evaporator to yield an acetone-soluble component. The resulting acetone-insoluble component and acetone-soluble component were each dried under reduced pressure at 80° C. for five hours.

The resulting acetone-insoluble component underwent a $^{13}$C solid NMR analysis under the same conditions as (3) above, and the component ratio was calculated from the area ratio of each peak appearing on the spectral chart of NMR.

(7) Content Ratio (d5, Mass %) of Structural Unit Derived from Acrylic Acid Ester-Based Monomer in Acetone-Soluble Component Contained in Graft Copolymer (A), with Respect to 100 Mass % of Soluble Component The resulting acetone-soluble component underwent a $^{13}$C-NMR analysis under the same conditions as (5) above, and the intensity ratio of each peak appearing on the spectral chart of NMR was used for determination.

(8) Verification of Whether Acrylic Acid Ester-Based Homopolymer Contained in Styrene-Based Thermoplastic Resin Composition is Found, and Amount Thereof (Mass %)

To approximately 2 g of freeze-pulverized styrene-based thermoplastic resin composition, 80 ml of methanol was added, the resulting mixture was refluxed in a hot-water bath at 70° C. for three hours, this solution was centrifuged at 12000 r.p.m. for 20 minutes, and then, the insoluble component was filtrated to yield a methanol-insoluble component. In addition, the filtrate was concentrated using a rotary evaporator to yield a methanol-soluble component. The resulting methanol-insoluble component and methanol-soluble component were each dried under reduced pressure at 80° C. for five hours.

Approximately 0.5 g of the resulting methanol-soluble component was dissolved in approximately 100 g of chloroform to prepare a solution, and this solution was used for GPC preparative fractionation. In this regard, the GPC preparative fractionation was performed under the following conditions:

Measurement device: manufactured by Shimadzu Corporation
Pump: LC-6A
Fraction collector: FRC-10A
Column temperature: 45° C.
Detector: RID-10A (differential refractometer)
Carrier eluent flow rate: 2.8 ml/min (solvent: chloroform)
Column: Shodex K2002 (20.0 mm I.D.×30 cm) and Shodex K2003 (20.0 mm I.D.×30 cm) in series (both manufactured by Showa Denko K.K.).

The resulting GPC preparative fractions each underwent a $^1$H-NMR measurement. Each peak intensity appearing on the spectral chart of NMR was used to verify whether any acrylic acid ester-based homopolymer was found, and to determine the amount of the homopolymer, if any.

The measurement conditions for $^1$H-NMR are listed below.

Device: ECA-400 manufactured by JEOL RESONANCE Co., Ltd.
Measurement method: single pulse
Observation frequency: 399.78 MHz
Solvent: chloroform-d
Concentration: each preparative fraction/0.65 ml (sample/chloroform-d)
Chemical shift standard: Me$_4$Si
Temperature: room temperature
Observation width: 8000 Hz
Data point: 32768
Pulse width: 6.45
Delay time: 15.0 s
Cumulated number of times: 64 times
Rotational frequency of sample: 15.0 Hz (9) Transparency (Haze (Haze) and Total Light Transmittance)

Resin composition pellets were dried in a hot-air dryer at 80° C. for three hours, and then supplied into a molding machine SE-50DU manufactured by Sumitomo Heavy Industries, Ltd. with the cylinder temperature set at 230° C., and the pellets were immediately molded into a rectangular plate molding having a thickness of 3 mm. Five rectangular plate moldings thus obtained were measured for haze and total light transmittance using a direct-reading haze meter manufactured by Toyo Seiki Seisaku-sho, Ltd., and a number-average value of the measurements was calculated.

(10) Impact Resistance (Charpy Impact Strength)

Resin composition pellets were dried in a hot-air dryer at 80° C. for three hours, and then supplied into a molding machine SE-50DU manufactured by Sumitomo Heavy Industries, Ltd. with the cylinder temperature set at 230° C., and the pellets were immediately molded into a dumbbell test piece having a thickness of 4 mm. Seven dumbbell test pieces thus obtained were measured for Charpy impact strength by a method in accordance with ISO179, and a number-average value of the measurements was calculated.

(11) Flowability (Melt Flow Rate)

Resin composition pellets were dried in a hot-air dryer at 80° C. for three hours, and then measured for the melt flow rate under conditions at 220° C. and 98N in accordance with ISO1133.

Production Example 1: Graft Copolymer (A-1)

Into a reactor having an agitating blade, 40 parts by mass of polybutadiene latex (in terms of a solid content), 90 parts by mass of pure water, 0.4 part by mass of sodium laurate, 0.4 part by mass of dextrose, 0.3 part by mass of sodium pyrophosphate, and 0.005 part by mass of ferrous sulfate were fed. The reactor was purged with nitrogen, and the temperature was regulated to 60° C. To the resulting mixture, a monomer mixture of 5.1 parts by mass of styrene, 12.9 parts by mass of methyl methacrylate, 2.0 parts by mass of n-butyl acrylate, and 0.2 part by mass of t-dodecyl mercaptan was initially added with stirring over 45 minutes.

Then, 0.2 part by mass of cumene hydroperoxide, 1.6 parts by mass of sodium laurate as an emulsifier, and 30 parts by mass of pure water were continuously added over four hours. In parallel, a monomer mixture of 11.1 parts by mass of styrene, 24.9 parts by mass of methyl methacrylate, 4.0 parts by mass of n-butyl acrylate, and 0.25 part by mass of t-dodecyl mercaptan was continuously added over three hours. After the further addition of the monomer mixture, the resulting mixture was retained for one hour to complete the polymerization. The resulting graft copolymer latex was coagulated with 1.5 mass % sulfuric acid, and then, neutralized with sodium hydroxide, washed, centrifuged, and dried to yield a graft copolymer (A-1) in powder form (the monomer ratios: styrene, 27 mass %; methyl methacrylate, 63 mass %; and n-butyl acrylate, 10 mass %). The resulting graft copolymer (A-1) had a graft ratio of 70%. In addition, the acetone-soluble component had a number-average molecular weight of 43,000.

Production Example 2: Graft Copolymer (A-2)

Into a reactor having an agitating blade, 40 parts by mass of polybutadiene latex (in terms of a solid content), 90 parts by mass of pure water, 0.4 part by mass of sodium laurate, 0.4 part by mass of dextrose, 0.3 part by mass of sodium pyrophosphate, and 0.005 part by mass of ferrous sulfate were fed. The reactor was purged with nitrogen, and the temperature was regulated to 60° C. To the resulting mixture, a monomer mixture of 5.2 parts by mass of styrene, 12 parts by mass of methyl methacrylate, 2.0 parts by mass of n-butyl acrylate, 0.8 part by mass of acrylonitrile, and 0.2 part by mass of t-dodecyl mercaptan was initially added with stirring over 45 minutes.

Then, 0.2 part by mass of cumene hydroperoxide, 1.6 parts by mass of sodium laurate as an emulsifier, and 30 parts by mass of pure water were continuously added over four hours. In parallel, a monomer mixture of 10.5 parts by mass of styrene, 23.9 parts by mass of methyl methacrylate, 4.0 parts by mass of n-butyl acrylate, 1.6 parts by mass of acrylonitrile, and 0.25 part by mass of t-dodecyl mercaptan was continuously added over three hours. Upon the further addition of the monomer mixture, the resulting mixture was retained for one hour to complete the polymerization. The resulting graft copolymer latex was coagulated with 1.5 mass % sulfuric acid, and then, neutralized with sodium hydroxide, washed, centrifuged, and dried to yield a graft copolymer (A-1) in powder form (the monomer ratios: styrene, 26 mass %; methyl methacrylate, 60 mass %; n-butyl acrylate, 10 mass %; and acrylonitrile, 4 mass %). The resulting graft copolymer (A-2) had a graft ratio of 73%. In addition, the acetone-soluble component had a number-average molecular weight of 46,000.

Production Example 3: Graft Copolymer (A-3)

Into a reactor having an agitating blade, 40 parts by mass of polybutadiene latex (in terms of a solid content), 90 parts by mass of pure water, 0.4 part by mass of sodium laurate, 0.4 part by mass of dextrose, 0.3 part by mass of sodium pyrophosphate, and 0.005 part by mass of ferrous sulfate were fed. The reactor was purged with nitrogen, and the temperature was regulated to 60° C. To the resulting mixture, a monomer mixture of 6.2 parts by mass of styrene, 12.8 parts by mass of methyl methacrylate, 1.0 parts by mass of n-butyl acrylate, and 0.2 part by mass of t-dodecyl mercaptan was initially added with stirring over 45 minutes.

Then, 0.2 part by mass of cumene hydroperoxide, 1.6 parts by mass of sodium laurate as an emulsifier, and 30 parts by mass of pure water were continuously added over four hours. In parallel, a monomer mixture of 10.1 parts by mass of styrene, 24.9 parts by mass of methyl methacrylate, 5.0 parts by mass of n-butyl acrylate, and 0.25 part by mass of t-dodecyl mercaptan was continuously added over three hours. Upon the further addition of the monomer mixture, the resulting mixture was retained for one hour to complete the polymerization. The resulting graft copolymer latex was coagulated with 1.5 mass % sulfuric acid, and then, neutralized with sodium hydroxide, washed, centrifuged, and dried to yield a graft copolymer (A-3) in powder form (the monomer ratios: styrene, 27 mass %; methyl methacrylate, 63 mass %; and n-butyl acrylate, 10 mass %). The resulting graft copolymer (A-3) had a graft ratio of 71%. In addition, the acetone-soluble component had a number-average molecular weight of 44,000.

Production Example 4: Graft Copolymer (A-4)

Into a reactor having an agitating blade, 40 parts by mass of polybutadiene latex (in terms of a solid content), 90 parts by mass of pure water, 0.4 part by mass of sodium laurate, 0.4 part by mass of dextrose, 0.3 part by mass of sodium pyrophosphate, and 0.005 part by mass of ferrous sulfate were fed. The reactor was purged with nitrogen, and the temperature was regulated to 60° C. To the resulting mixture, a monomer mixture of 5.1 parts by mass of styrene, 11.9 parts by mass of methyl methacrylate, 3.0 parts by mass of n-butyl acrylate, and 0.2 part by mass of t-dodecyl mercaptan was initially added with stirring over 45 minutes.

Then, 0.2 part by mass of cumene hydroperoxide, 1.6 parts by mass of sodium laurate as an emulsifier, and 30 parts by mass of pure water were continuously added over four hours. In parallel, a monomer mixture of 11.1 parts by mass of styrene, 25.9 parts by mass of methyl methacrylate, 3.0 parts by mass of n-butyl acrylate, and 0.25 part by mass of t-dodecyl mercaptan was continuously added over three hours. After the further addition of the monomer mixture, the resulting mixture was retained for one hour to complete the polymerization. The resulting graft copolymer latex was coagulated with 1.5 mass % sulfuric acid, and then, neutralized with sodium hydroxide, washed, centrifuged, and dried to yield a graft copolymer (A-5) in powder form (the monomer ratios: styrene, 27 mass %; methyl methacrylate, 63 mass %; and n-butyl acrylate, 10 mass %). The resulting graft copolymer (A-5) had a graft ratio of 65%. In addition, the acetone-soluble component had a number-average molecular weight of 41,000.

Production Example 5: Graft Copolymer (A-5)

Into a reactor having an agitating blade, 40 parts by mass of polybutadiene latex (in terms of a solid content), 90 parts by mass of pure water, 0.4 part by mass of sodium laurate, 0.4 part by mass of dextrose, 0.3 part by mass of sodium pyrophosphate, and 0.005 part by mass of ferrous sulfate were fed. The reactor was purged with nitrogen, and the temperature was regulated to 60° C. To the resulting mixture, a monomer mixture of 4.5 parts by mass of styrene, 15.5 parts by mass of methyl methacrylate, and 0.2 part by mass of t-dodecyl mercaptan was initially added with stirring over 45 minutes.

Then, an initiator mixture of 0.2 part by mass of cumene hydroperoxide, 1.6 parts by mass of sodium laurate as an emulsifier, and 30 parts by mass of pure water was continuously added over four hours. In parallel, a monomer mixture of 10 parts by mass of styrene, 30 parts by mass of methyl methacrylate, and 0.25 part by mass of t-dodecyl mercaptan was continuously added over three hours. After the further addition of the monomer mixture, the resulting mixture was retained for one hour to complete the polymerization. The resulting graft copolymer latex was coagulated with 1.5 mass % sulfuric acid, and then, neutralized with sodium hydroxide, washed, centrifuged, and dried to yield a graft copolymer (A-5) in powder form (the monomer ratios: styrene, 27 mass %; methyl methacrylate, 63 mass %; and n-butyl acrylate, 10 mass %). The resulting graft copolymer (A-5) had a graft ratio of 71%. In addition, the acetone-soluble component had a number-average molecular weight of 45,000.

Production Example 6: Graft Copolymer (A-6)

Into a reactor having an agitating blade, 40 parts by mass of polybutadiene latex (in terms of a solid content), 90 parts by mass of pure water, 0.4 part by mass of sodium laurate, 0.4 part by mass of dextrose, 0.3 part by mass of sodium pyrophosphate, and 0.005 part by mass of ferrous sulfate were fed. The reactor was purged with nitrogen, and the temperature was regulated to 60° C. To the resulting mixture, a monomer mixture of 9.75 parts by mass of styrene, 2.0 parts by mass of n-butyl acrylate, 3.25 part by mass of acrylonitrile, and 0.2 part by mass of t-dodecyl mercaptan was initially added with stirring over 45 minutes.

Then, 0.2 part by mass of cumene hydroperoxide, 1.6 parts by mass of sodium laurate as an emulsifier, and 30 parts by mass of pure water were continuously added over four hours. In parallel, a monomer mixture of 30.75 parts by mass of styrene, 4.0 parts by mass of n-butyl acrylate, 10.25 parts by mass of acrylonitrile, and 0.25 part by mass of t-dodecyl mercaptan was continuously added over three hours. After the further addition of the monomer mixture, the resulting mixture was retained for one hour to complete the polymerization. The resulting graft copolymer latex was coagulated with 1.5 mass % sulfuric acid, and then, neutralized with sodium hydroxide, washed, centrifuged, and dried to yield a graft copolymer (A-6) in powder form (the monomer ratios: styrene, 67.5 mass %; n-butyl acrylate, 10 mass %; and acrylonitrile, 22.5 mass %). The resulting graft copolymer (A-6) had a graft ratio of 62%. In addition, the acetone-soluble component had a number-average molecular weight of 40,000.

Production Example 7: Graft Copolymer (A-7)

Into a reactor having an agitating blade, 40 parts by mass of polybutadiene latex (in terms of a solid content), 90 parts by mass of pure water, 0.4 part by mass of sodium laurate, 0.4 part by mass of dextrose, 0.3 part by mass of sodium pyrophosphate, and 0.005 part by mass of ferrous sulfate were fed. The reactor was purged with nitrogen, and the temperature was regulated to 60° C. To the resulting mixture, a monomer mixture of 11.25 parts by mass of styrene, 3.75 part by mass of acrylonitrile, and 0.2 part by mass of t-dodecyl mercaptan was initially added with stirring over 45 minutes.

Then, 0.2 part by mass of cumene hydroperoxide, 1.6 parts by mass of sodium laurate as an emulsifier, and 30 parts by mass of pure water were continuously added over four hours. In parallel, a monomer mixture of 33.75 parts by mass of styrene, 4 parts by mass of n-butyl acrylate, 11.25 parts by mass of acrylonitrile, and 0.25 part by mass of t-dodecyl mercaptan was continuously added over three hours. After the further addition of the monomer mixture, the resulting mixture was retained for one hour to complete the polymerization. The resulting graft copolymer latex was coagulated with 1.5 mass % sulfuric acid, and then, neutralized with sodium hydroxide, washed, centrifuged, and dried to yield a graft copolymer (A-7) in powder form (the monomer ratios: styrene, 75 mass %; and acrylonitrile, 25 mass %). The resulting graft copolymer (A-7) had a graft ratio of 64%. In addition, the acetone-soluble component had a number-average molecular weight of 41,000.

The details of the above-mentioned graft polymers are listed in Table 1.

Production Example 8: Graft Copolymer (A-8)

Into a reactor having an agitating blade, 40 parts by mass of polybutadiene latex (in terms of a solid content), 90 parts by mass of pure water, 0.4 part by mass of sodium laurate, 0.4 part by mass of dextrose, 0.3 part by mass of sodium pyrophosphate, and 0.005 part by mass of ferrous sulfate were fed. The reactor was purged with nitrogen, and the temperature was regulated to 60° C. To the resulting mixture, a monomer mixture of 6.0 parts by mass of styrene, 10.0 parts by mass of methyl methacrylate, 4.0 parts by mass of n-butyl acrylate, and 0.2 part by mass of t-dodecyl mercaptan was initially added with stirring over 45 minutes.

Then, an initiator mixture of 0.2 part by mass of cumene hydroperoxide, 1.6 parts by mass of sodium laurate as an emulsifier, and 30 parts by mass of pure water was continuously added over four hours. In parallel, a monomer mixture of 10.0 parts by mass of styrene, 29.0 parts by mass of methyl methacrylate, 1.0 parts by mass of n-butyl acrylate, and 0.25 part by mass of t-dodecyl mercaptan was continuously added over three hours. After the further addition of the monomer mixture, the resulting mixture was retained for one hour to complete the polymerization. The resulting graft copolymer latex was coagulated with 1.5 mass % sulfuric acid, and then, neutralized with sodium hydroxide, washed, centrifuged, and dried to yield a graft copolymer (A-8) in powder form (the monomer ratios: styrene, 26.7 mass %; methyl methacrylate, 65 mass %; and n-butyl acrylate, 8.3 mass %). The resulting graft copolymer (A-8) had a graft ratio of 63%. In addition, the acetone-soluble component had a number-average molecular weight of 42,000.

TABLE 1

|  |  | Production Example 1 | Production Example 2 | Production Example 3 | Production Example 4 | Production Example 5 | Production Example 6 | Production Example 7 | Production Example 8 |
|---|---|---|---|---|---|---|---|---|---|
| Graft Copolymer |  | A-1 | A-2 | A-3 | A-4 | A-5 | A-6 | A-7 | A-8 |
| Polybutadiene Rubber Latex (in terms of solid content) | parts by mass | 40 | 40 | 40 | 40 | 40 | 40 | 40 | 40 |
| Initial Addition — Styrene | parts by mass | 5.1 | 5.2 | 6.2 | 5.1 | 4.5 | 9.75 | 11.25 | 6.0 |
| Initial Addition — Methyl Methacrylate | parts by mass | 12.9 | 12.0 | 12.8 | 11.9 | 15.5 |  |  | 10.0 |
| Initial Addition — Acrylonitrile | parts by mass |  | 0.8 |  |  |  | 3.25 | 3.75 |  |
| Initial Addition — n-Butyl Acrylate | parts by mass | 2.0 | 2.0 | 1.0 | 3.0 |  | 2.0 |  | 4.0 |
| Further Addition — Styrene | parts by mass | 11.1 | 10.5 | 10.1 | 11.1 | 10.0 | 30.75 | 33.75 | 10.0 |
| Further Addition — Methyl Methacrylate | parts by mass | 24.9 | 23.9 | 24.9 | 25.9 | 30.0 | 10.25 | 11.25 | 29.0 |
| Further Addition — Acrylonitrile | parts by mass |  | 1.6 |  |  |  |  |  |  |
| Further Addition — n-Butyl Acrylate | parts by mass | 4.0 | 4.0 | 5.0 | 3.0 |  | 4.0 |  | 1.0 |
| Graft Ratio | % | 70 | 73 | 71 | 65 | 71 | 62 | 64 | 63 |

Production Example 9: Acrylic Acid Ester-Based Homopolymer

Slurry obtained by suspension polymerization of n-butyl acrylate underwent a washing, a dehydrating, and a drying step to yield an n-butyl acrylate homopolymer. The resulting n-butyl acrylate homopolymer had a number-average molecular weight of 13,000.

Example 1

A vinyl-based copolymer (B-1) and a styrene-based thermoplastic resin composition were produced by the below-mentioned method using a continuous mass polymerization device composed of the following: a 2-m$^3$ complete mixing type reactor having a condenser and a helical ribbon impeller that are for evaporation and dry distillation of monomer vapor; a single screw extruder type preheater; a twin screw extruder type devolatilizer; and a twin screw extruder type feeder connected such that side feeding was allowed into a barrel section located at a distance corresponding to a ⅓ length of the devolatilizer in the upstream direction from the downstream end (outlet) of the devolatilizer.

First, a monomer mixture composed of 23.5 parts by mass of styrene, 4.5 parts by mass of acrylonitrile, 72 parts by mass of methyl methacrylate, 0.26 part by mass of n-octyl mercaptan, and 0.015 part by mass of 1,1-bis(t-butylperoxy) cyclohexane was continuously supplied into the complete mixing type reactor at 150 kg/hour, and continuously mass-polymerized with the polymerization temperature maintained at 130° C. and with the vessel internal pressure maintained at 0.08 MPa. The rate of polymerization of the polymerization reaction mixture was controlled to 65±3% at the outlet of the complete mixing type reactor.

Next, the polymerization reaction mixture was preheated using the single screw extruder type preheater, and then, supplied into the twin screw extruder type devolatilizer, and the unreacted monomer was evaporated and collected under reduced pressure through the vent port of the twin screw extruder type devolatilizer. The unreacted monomer collected was refluxed into the continuous complete mixing type reactor. To 150 kg/hour of styrene/acrylonitrile/methyl methacrylate copolymer, the apparent rate of polymerization of which had reached 99% or more at a distance corresponding to a ⅓ of the full length of the twin screw extruder type devolatilizer in the upstream direction from the downstream end of the devolatilizer, 0.225 kg/hour of t-butylhydroxytoluene as a phenol-based stabilizer, 0.225 kg/hour of tri(nonylphenyl)phosphite as a phosphorus-based stabilizer, and 69 kg/hour of semi-molten product of the graft copolymer (A-1) produced in Production Example 1 were supplied using the twin screw extruder type feeder, and melt-kneaded with the styrene/acrylonitrile/methyl methacrylate copolymer in the twin screw extruder type devolatilizer. In the melt-kneading step, 2 kg/hour of water was supplied at a distance corresponding to a ⅙ of the full length of the twin screw extruder type devolatilizer in the upstream direction from the downstream end of the devolatilizer. This water and other volatile components were removed by evaporation under reduced pressure through the vent port disposed further downstream of the twin screw extruder type devolatilizer. Then, the melt-kneaded product was discharged in strand form, and cut using a cutter to yield pellets of the styrene-based thermoplastic resin composition.

In addition, the supply from the twin screw extruder type feeder was stopped, and the styrene/acrylonitrile/methyl methacrylate copolymer was discharged and sampled. The characteristics of the resulting styrene/acrylonitrile/methyl methacrylate copolymer and styrene-based thermoplastic resin composition were evaluated by the above-mentioned methods.

Example 2

Pellets of a styrene-based thermoplastic resin composition were obtained in the same manner as in Example 1 except that the graft copolymer (A-2) produced in Production Example 2 was used in place of the graft copolymer (A-1) produced in Production Example 1.

Example 3

Pellets of a styrene-based thermoplastic resin composition were obtained in the same manner as in Example 1 except that the graft copolymer (A-3) produced in Production Example 3 was used in place of the graft copolymer (A-1) produced in Production Example 1.

Example 4

Pellets of a styrene-based thermoplastic resin composition were obtained in the same manner as in Example 1 except that the graft copolymer (A-4) produced in Production Example 4 was used in place of the graft copolymer (A-1) produced in Production Example 1.

Example 5

Pellets of a styrene-based thermoplastic resin composition were obtained in the same manner as in Example 1 except that the acrylic acid ester-based homopolymer produced in Production Example 9 was supplied at 0.6 kg/hour using the twin screw extruder type feeder.

Example 6

Pellets of a styrene-based thermoplastic resin composition were obtained in the same manner as in Example 1 except that the acrylic acid ester-based homopolymer produced in Production Example 9 was supplied at 1.8 kg/hour using the twin screw extruder type feeder.

Example 7

A vinyl-based copolymer (B-2) and a styrene-based thermoplastic resin composition were produced by the below-mentioned method using a continuous mass polymerization device composed of the following: a 2-m³ complete mixing type reactor having a condenser and a helical ribbon impeller that are for evaporation and dry distillation of monomer vapor; a single screw extruder type preheater; a twin screw extruder type devolatilizer; and a twin screw extruder type feeder connected such that side feeding was allowed into a barrel section located at a distance corresponding to a ⅓ length of the devolatilizer in the upstream direction from the downstream end (outlet) of the devolatilizer.

First, a monomer mixture composed of 75.0 parts by mass of styrene, 25.0 parts by mass of acrylonitrile, 0.26 part by mass of n-octyl mercaptan, and 0.015 part by mass of 1,1-bis(t-butylperoxy)cyclohexane was continuously supplied into the complete mixing type reactor at 150 kg/hour, and continuously mass-polymerized with the polymerization temperature maintained at 130° C. and with the vessel internal pressure maintained at 0.08 MPa. The rate of polymerization of the polymerization reaction mixture was controlled to 65±3% at the outlet of the complete mixing type reactor.

Next, the polymerization reaction mixture was preheated using the single screw extruder type preheater, and then, supplied into the twin screw extruder type devolatilizer, and the unreacted monomer was evaporated and collected under reduced pressure through the vent port of the twin screw extruder type devolatilizer. The unreacted monomer collected was refluxed into the continuous complete mixing type reactor. To 150 kg/hour of styrene/acrylonitrile copolymer, the apparent rate of polymerization of which had reached 99% or more at a distance corresponding to a ⅓ of the full length of the twin screw extruder type devolatilizer in the upstream direction from the downstream end of the devolatilizer, 0.225 kg/hour of t-butylhydroxytoluene as a phenol-based stabilizer, 0.225 kg/hour of tri(nonylphenyl)phosphite as a phosphorus-based stabilizer, and 69 kg/hour of semi-molten product of the graft copolymer (A-6) produced in Production Example 1 were supplied using the twin screw extruder type feeder, and melt-kneaded with the styrene/acrylonitrile copolymer in the twin screw extruder type devolatilizer. In the melt-kneading step, 2 kg/hour of water was supplied at a distance corresponding to a ⅙ of the full length of the twin screw extruder type devolatilizer in the upstream direction from the downstream end of the devolatilizer. This water and other volatile components were removed by evaporation under reduced pressure through the vent port disposed further downstream of the twin screw extruder type devolatilizer. Then, the melt-kneaded product was discharged in strand form, and cut using a cutter to yield pellets of the styrene-based thermoplastic resin composition.

Example 8

Pellets of a styrene-based thermoplastic resin composition were obtained in the same manner as in Example 1 except that the graft copolymer (A-8) produced in Production Example 8 was used in place of the graft copolymer (A-1) produced in Production Example 1.

Comparative Example 1

Pellets of a styrene-based thermoplastic resin composition were obtained in the same manner as in Example 1 except that the graft copolymer (A-5) produced in Production Example 5 was used in place of the graft copolymer (A-1) produced in Production Example 1.

Comparative Example 2

Pellets of a styrene-based thermoplastic resin composition were obtained using the vinyl-based copolymer (B-3) obtained in the same method as the method of producing a vinyl-based copolymer described in Example 1 except that a monomer mixture composed of 26.3 mass % of styrene, 4.0 mass % of acrylonitrile, 59.7 mass % of methyl methacrylate, and 10.0 mass % n-butyl acrylate was used in place of the vinyl-based copolymer (B-1).

Comparative Example 3

Pellets of a styrene-based thermoplastic resin composition were obtained in the same manner as in Example 7 except that the graft copolymer (A-7) produced in Production Example 7 was used in place of the graft copolymer (A-6) produced in Production Example 6.

The compositions of the resulting styrene-based thermoplastic resin compositions are listed in Table 2, and the evaluation results are listed in Table 3.

TABLE 2

|  |  |  | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|---|---|
| Graft Copolymer | A-1 | parts by mass | 31.5 |  |  |  | 31.5 | 31.5 |  |  |  | 31.5 |  |
|  | A-2 | parts by mass |  | 31.5 |  |  |  |  |  |  |  |  |  |
|  | A-3 | parts by mass |  |  | 31.5 |  |  |  |  |  |  |  |  |
|  | A-4 | parts by mass |  |  |  | 31.5 |  |  |  |  |  |  |  |
|  | A-5 | parts by mass |  |  |  |  |  |  |  |  | 31.5 |  |  |
|  | A-6 | parts by mass |  |  |  |  |  |  | 31.5 |  |  |  |  |
|  | A-7 | parts by mass |  |  |  |  |  |  |  |  |  |  | 31.5 |
|  | A-8 | parts by mass |  |  |  |  |  |  |  | 31.5 |  |  |  |
| Vinyl-based Copolymer | B-1 | parts by mass | 68.5 | 68.5 | 68.5 | 68.5 | 68.5 | 68.5 |  | 68.5 | 68.5 |  |  |
|  | B-2 | parts by mass |  |  |  |  |  |  | 68.5 |  |  |  | 68.5 |
|  | B-3 | parts by mass |  |  |  |  |  |  |  |  |  | 68.5 |  |
| Acrylic Acid Ester-based Homopolymer |  | parts by mass |  |  |  |  | 0.3 | 0.8 |  |  |  |  |  |

Table 2 (Supplement)

| | Composition of Monomer Mixture | | | |
|---|---|---|---|---|
| Vinyl-based Copolymer | Styrene mass % | Methyl Methacrylate mass % | Acrylonitrile mass % | n-Butyl Acrylate mass % |
| B-1 | 23.5 | 72.0 | 4.5 | |
| B-2 | 75.0 | | 25.0 | |
| B-3 | 26.3 | 59.7 | 4.0 | 10.0 |

TABLE 3

|  |  | Example 1 | Example 2 | Example 3 | Example 4 | Example 5 | Example 6 |
|---|---|---|---|---|---|---|---|
| Charpy Impact Strength | kJ/m$^2$ | 10.0 | 10.2 | 9.2 | 8.8 | 9.8 | 9.2 |
| Melt Flow Rate | g/10 min | 22 | 22 | 24 | 16 | 22 | 21 |
| Total Light Transmittance | % | 88.5 | 88.2 | 88.5 | 88.1 | 88.4 | 88.0 |
| Haze (Haze) | — | 2.8 | 2.9 | 2.6 | 3.0 | 2.8 | 3.2 |
| (d1) | mass % | 4.4 | 4.8 | 2.0 | 7.5 | 4.2 | 4.0 |
| (d2/d3) | — | 11.0 | 11.5 | 5.1 | 18.7 | 8.5 | 6.2 |
| (d4/d5) | — | 1.8 | 1.9 | 0.8 | 3.0 | 1.8 | 1.8 |
| (d6) | mass % | <0.1 | <0.1 | <0.1 | <0.1 | 0.26 | 0.81 |

|  |  | Example 7 | Example 8 | Comparative Example 1 | Comparative Example 2 | Comparative Example 3 |
|---|---|---|---|---|---|---|
| Charpy Impact Strength | kJ/m$^2$ | 17.9 | 9.2 | 7.1 | 6.2 | 16.6 |
| Melt Flow Rate | g/10 min | 21 | 20 | 11 | 26 | 13 |

TABLE 3-continued

|  |  |  |  |  |  |  |
|---|---|---|---|---|---|---|
| Total Light Transmittance | % | — | 88.2 | 87.3 | 87.5 | — |
| Haze (Haze) |  | — | 2.9 | 4.1 | 3.8 | — |
| (d1) | mass % | 4.5 | 5.5 | <0.1 | 4.5 | <0.1 |
| (d2/d3) |  | 11.3 | 72.5 | — | 1.4 | — |
| (d4/d5) |  | 1.5 | 5.4 | — | 1.8 | — |
| (d6) | mass % | <0.1 | <0.1 | <0.1 | <0.1 | <0.1 |

As understood from the evaluation results in Examples 1 to 8, our styrene-based thermoplastic resin compositions can be formed into moldings having both excellent impact resistance and good flowability.

On the other hand, Comparative Examples 1 and 3 used a graft copolymer that did not have an acrylic acid ester-based monomer as a monomer, and thus, had poor flowability. In addition, Comparative Example 2 used a vinyl-based copolymer that had an acrylic acid ester-based monomer as a monomer, and thus, had poor impact resistance.

INDUSTRIAL APPLICABILITY

Our styrene-based thermoplastic resin compositions and moldings can be widely used in applications such as home electric appliances, communication devices, general merchandise, and medical devices.

The invention claimed is:

1. A styrene-based thermoplastic resin composition comprising:
   (A) a graft copolymer obtained by graft-polymerizing, in the presence of a conjugated-diene-based rubber, (a) a monomer mixture containing at least an aromatic vinyl-based monomer and an acrylic acid ester-based monomer; and
   (B) a vinyl-based copolymer obtained by polymerizing (b) a monomer mixture containing at least an aromatic vinyl-based monomer and a vinyl cyanide-based monomer and containing substantially no acrylic acid ester-based monomer,
   wherein said styrene-based thermoplastic resin composition contains a component insoluble in acetone,
   the acetone-insoluble component contains a structural unit derived from said acrylic acid ester-based monomer,
   a content ratio (d1) of said structural unit is 1 to 7 mass % with respect to 100 mass % of said acetone-insoluble component; and
   a ratio (d2/d3) is 4 to 75 between the following:
   the content ratio (d2, mass %) of said structural unit derived from said acrylic acid ester-based monomer in said acetone-insoluble component, with respect to 100 mass % of the mass obtained by subtracting the mass corresponding to said conjugated-diene-based rubber contained in the insoluble component from the mass of said insoluble component; and
   the content ratio (d3, mass %) of a structural unit derived from said acrylic acid ester-based monomer in the acetone-soluble component, with respect to 100 mass % of the soluble component in said styrene-based thermoplastic resin composition.

2. The styrene-based thermoplastic resin composition according to claim 1, wherein said monomer mixture (a) contains a methacrylic acid ester-based monomer.

3. The styrene-based thermoplastic resin composition according to claim 1, wherein said monomer mixture (b) contains a methacrylic acid ester-based monomer.

4. The styrene-based thermoplastic resin composition according to claim 1,
   wherein
   a ratio (d4/d5) is 2.0 or less between the following:
   the content ratio (d4, mass %) of a structural unit derived from said acrylic acid ester-based monomer in the acetone-insoluble component contained in said graft polymer (A), with respect to 100 mass % of the mass obtained by subtracting the mass corresponding to said conjugated-diene-based rubber contained in the insoluble component from the mass of the insoluble component; and
   the content ratio (d5, mass %) of a structural unit derived from said acrylic acid ester-based monomer in the acetone-soluble component contained in said graft polymer (A), with respect to 100 mass % of the mass of the soluble component contained in said graft copolymer (A).

5. The styrene-based thermoplastic resin composition according to claim 1, wherein said acrylic acid ester-based monomer used for said graft copolymer (A) is n-butyl acrylate or methyl acrylate.

6. The styrene-based thermoplastic resin composition according to claim 1, wherein a content ratio of an acrylic acid ester-based homopolymer is 0.0 mass % to 0.5 mass % with respect to 100 mass % of the mass of said styrene-based thermoplastic resin composition.

7. A molding obtained by molding said styrene-based thermoplastic resin composition according to claim 1.

8. A method of producing said styrene-based thermoplastic resin composition according to claim 1, comprising producing said graft copolymer (A) by emulsion polymerization.

9. A method of producing a molding comprising molding the styrene-based thermoplastic resin composition obtained by the method according to claim 8.

10. A styrene-based thermoplastic resin composition comprising:
    (A) a graft copolymer obtained by graft-polymerizing, in the presence of a conjugated-diene-based rubber, (a) a monomer mixture containing at least an aromatic vinyl-based monomer and an acrylic acid ester-based monomer; and
    (B) a vinyl-based copolymer obtained by polymerizing (b) a monomer mixture containing at least an aromatic vinyl-based monomer and a vinyl cyanide-based monomer and containing substantially no acrylic acid ester-based monomer,
    wherein said graft copolymer (A) contains a component insoluble in acetone, and
    a ratio (d4/d5) is 2.0 or less between the following:
    the content ratio (d4, mass %) of a structural unit derived from said acrylic acid ester-based monomer in the acetone-insoluble component, with respect to 100 mass % of the mass obtained by subtracting the mass corresponding to said conjugated-diene-based rubber contained in the insoluble component from the mass of said insoluble component; and the content ratio (d5, mass %) of a structural unit derived from said acrylic acid ester-based monomer in the acetone-soluble component, with respect to 100 mass % of the mass of the soluble component contained in said graft copolymer (A).

11. The styrene-based thermoplastic resin composition according to claim 10, wherein said monomer mixture (a) contains a methacrylic acid ester-based monomer.

12. The styrene-based thermoplastic resin composition according to claim 10, wherein said monomer mixture (b) contains a methacrylic acid ester-based monomer.

13. The styrene-based thermoplastic resin composition according to claim 10, wherein said acrylic acid ester-based monomer used for said graft copolymer (A) is n-butyl acrylate or methyl acrylate.

14. The styrene-based thermoplastic resin composition according to claim 10, wherein a content ratio of an acrylic acid ester-based homopolymer is 0.0 mass % to 0.5 mass % with respect to 100 mass % of the mass of said styrene-based thermoplastic resin composition.

15. A molding obtained by molding said styrene-based thermoplastic resin composition according to claim 10.

16. A method of producing said styrene-based thermoplastic resin composition according to claim 10, comprising producing said graft copolymer (A) by emulsion polymerization.

17. A method of producing a molding comprising molding the styrene-based thermoplastic resin composition obtained by the method according to claim 16.

\* \* \* \* \*